United States Patent
Ohta et al.

(10) Patent No.: US 12,144,015 B2
(45) Date of Patent: *Nov. 12, 2024

(54) WIRELESS COMMUNICATION DEVICE, METHOD, AND SYSTEM FOR WIRELESS CONNECTION USING A PACKET INCLUDING TRANSMISSION NUMBER

(71) Applicant: FUJITSU LIMITED, Kawasaki (JP)

(72) Inventors: Yoshiaki Ohta, Yokohama (JP); Takayoshi Ode, Yokohama (JP); Shinichiro Aikawa, Yokohama (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,362

(22) Filed: May 26, 2023

(65) Prior Publication Data
US 2023/0300871 A1 Sep. 21, 2023

Related U.S. Application Data

(63) Continuation of application No. 16/596,382, filed on Oct. 8, 2019, now Pat. No. 11,700,631, which is a
(Continued)

(51) Int. Cl.
*H04W 72/542* (2023.01)
*H04W 28/02* (2009.01)
(Continued)

(52) U.S. Cl.
CPC ..... *H04W 72/542* (2023.01); *H04W 28/0236* (2013.01); *H04W 76/10* (2018.02); *H04W 80/02* (2013.01)

(58) Field of Classification Search
CPC ........... H04W 72/542; H04W 28/0236; H04W 76/10; H04W 80/02
See application file for complete search history.

(56) References Cited

U.S. PATENT DOCUMENTS

2002/0136181 A1 9/2002 Belaiche et al.
2004/0033801 A1 2/2004 Yi et al.
(Continued)

FOREIGN PATENT DOCUMENTS

CN 1798107 A 7/2006
EP 1 675 349 A1 6/2006
(Continued)

OTHER PUBLICATIONS

Notice of Reasons for Refusal issued by the Japan Patent Office for corresponding Japanese Patent Application No. 2019-512145, dated Jan. 9, 2024, with a full English machine translation.
(Continued)

*Primary Examiner* — Jackie Zuniga Abad
(74) *Attorney, Agent, or Firm* — Myers Wolin, LLC

(57) ABSTRACT

A wireless communication device that transmits data to another wireless communication device that performs wireless connection using a packet including a transmission number, the wireless communication device includes, a controller configured to classify the data as first data when a transmission condition indicating a condition related to transmission of the data is a first transmission condition and classifies the data as second data when the transmission condition of the data is a second transmission condition different from the first transmission condition, and a transmitter configured to transmit the data in a first transmission mode in a layer related to the wireless connection when the data is the first data and transmits the data in a second transmission mode in a layer related to the wireless connection when the second data is second data.

11 Claims, 16 Drawing Sheets

Related U.S. Application Data continuation of application No. PCT/JP2017/015272, filed on Apr. 14, 2017.

(51) Int. Cl.
 *H04W 76/10* (2018.01)
 *H04W 80/02* (2009.01)

(56) References Cited

U.S. PATENT DOCUMENTS

| | | |
|---|---|---|
| 2005/0117529 A1 | 6/2005 | Ramos-Escano et al. |
| 2005/0147040 A1 | 7/2005 | Vayanos et al. |
| 2005/0201353 A1 | 9/2005 | Lee et al. |
| 2007/0076707 A1 | 4/2007 | Link et al. |
| 2008/0285493 A1 | 11/2008 | Tseng |
| 2009/0323605 A1 | 12/2009 | Umesh et al. |
| 2010/0257423 A1 | 10/2010 | Kim |
| 2014/0348080 A1 | 11/2014 | Griot |
| 2015/0117245 A1 | 4/2015 | Zhang et al. |
| 2015/0156669 A1 | 6/2015 | Quan et al. |
| 2015/0381314 A1 | 12/2015 | Tomisawa |
| 2016/0338092 A1 | 11/2016 | Agiwal et al. |
| 2016/0352467 A1 | 12/2016 | Rawat et al. |
| 2017/0034862 A1 | 2/2017 | Ma et al. |
| 2018/0167945 A1 | 6/2018 | Cao et al. |

FOREIGN PATENT DOCUMENTS

| | | |
|---|---|---|
| JP | H10-308723 A | 11/1998 |
| JP | 2002-232376 A | 8/2002 |
| JP | 2003-508940 A | 3/2003 |
| JP | P2005-529552 A | 9/2005 |
| JP | 2006-180515 A | 7/2006 |
| JP | 2007-235787 A | 9/2007 |
| JP | 2009-273187 A | 11/2009 |
| JP | 2015-220644 A | 12/2015 |
| JP | 2016-529846 A | 9/2016 |
| WO | 2014129044 A1 | 8/2014 |
| WO | 2017/024557 A1 | 2/2017 |

OTHER PUBLICATIONS

Fujitsu, "MAC function for URLLC support", Agenda Item: 9.2.1.3 (Other user plane aspects), 3GPP TSG-RAN WG2 Meeting #95b, R2-166487, Kaohsiung, Chinese Taipei, Oct. 10-14, 2016.
Nokia et al., "Introduction of NB-IoT", Change Request, Work item code: NB_IOT-Core, 3GPP TSG-RAN1 Meeting #85,R1-165396, Nanjing, China, May 23-27, 2016.
Mediatek, Inc., "NR Radio Bearers and Logical Channels", Agenda Item: 9.6, 3GPP TSG-RAN2 Meeting #94, Tdoc R2-163894, 3GPP,2016, Nanjing, China, May 23-27, 2016.
CATT, "NR System Design for Forward Compatibility", Agenda Item: 7.1.1, 3GPP TSG-RAN WG1 #85, R1-164242, Nanjing, China, May 23-27, 2016.
Communication pursuant to Article 94(3) EPC issued by the European Patent Office for corresponding European Patent Application No. 17 905 517.3, dated Dec. 18, 2023.
3GPP TS 36.211 V14.1.0 (Dec. 2016), "3rd Generation Partnership Project; Technical Specification Group Radio Access Network; Evolved Universal Terrestrial Radio Access (E-UTRA); Physical channels and modulation," (Release 14), Dec. 2016.
3GPP TS 36.212 V14.1.1 (Jan. 2017), "3rd Generation Partnership Project; Technical Specification Group Radio Access Network; Evolved Universal Terrestrial Radio Access (E-UTRA); Multiplexing and channel coding," (Release 14), Jan. 2017.
3GPP TS 36.213 V14.1.0 (Dec. 2016),3rd Generation Partnership Project; Technical Specification Group Radio Access Network; Evolved Universal Terrestrial Radio Access (E-UTRA); Physical layer procedures, (Release 14), Dec. 2016.
3GPP TS 36.300 V14.1.0 (Dec. 2016), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 14), Dec. 2016.
3GPP TS 36.321 V14.1.0 (Dec. 2016), "3rd Generation Partnership Project; Technical Specification Group Radio Access Network; Evolved Universal Terrestrial Radio Access (E-UTRA); Medium Access Control (MAC) protocol specification," (Release 14), Dec. 2016.
3GPP TS 36.322 V13.2.0 (Jun. 2016), "3rd Generation Partnership Project; Technical Specification Group Radio Access Network; Evolved Universal Terrestrial Radio Access (E-UTRA); Radio Link Control (RLC) protocol specification," (Release 13), Jun. 2016.
3GPP TS 36.323 V14.1.0 (Dec. 2016), "3rd Generation Partnership Project; Technical Specification Group Radio Access Network; Evolved Universal Terrestrial Radio Access (E-UTRA); Packet Data Convergence Protocol (PDCP) specification," (Release 14), Dec. 2016.
3GPP TS 36.331 V14.1.0 (Dec. 2016), "3rd Generation Partnership Project; Technical Specification Group Radio Access Network; Evolved Universal Terrestrial Radio Access (E-UTRA); Radio Resource Control (RRC); Protocol specification," (Release 14), Dec. 2016.
3GPP TS 36.413 V14.1.0 (Jan. 2017), "3rd Generation Partnership Project; Technical Specification Group Radio Access Network; Evolved Universal Terrestrial Radio Access Network (E-UTRAN); S1 Application Protocol (S1AP)," (Release 14), Jan. 2017.
3GPP TS 36.423 V14.1.0 (Jan. 2017), "3rd Generation Partnership Project; Technical Specification Group Radio Access Network; Evolved Universal Terrestrial Radio Access Network (E-UTRAN); X2 application protocol (X2AP)," (Release 14), Jan. 2017.
3GPP TS 36.425 V13.1.1 (Sep. 2016), "3rd Generation Partnership Project; Technical Specification Group Radio Access Network; Evolved Universal Terrestrial Radio Access Network (E-UTRAN); X2 interface user plane protocol," (Release 13), Sep. 2016.
3GPP TR 38.801 V1.0.0 (Dec. 2016), "3rd Generation Partnership Project; Technical Specification Group Radio Access Network; Study on New Radio Access Technology; Radio Access Architecture and Interfaces," (Release 14), Dec. 2016.
3GPP TR 38.802 V1.1.0 (Jan. 2017), "3rd Generation Partnership Project; Technical Specification Group Radio Access Network; Study on New Radio (NR) Access Technology Physical Layer Aspects," (Release 14), Jan. 2017.
3GPP TR 38.803 V1.1.0 (Feb. 2017), "3rd Generation Partnership Project; Technical Specification Group Radio Access Network; Study on New Radio Access Technology; RF and co-existence aspects," (Release 14), Feb. 2017.
3GPP TR 38.804 V0.4.0 (Nov. 2016), 3rd Generation Partnership Project; Technical Specification Group Radio Access Network; Study on New Radio Access Technology; Radio Interface Protocol Aspects, (Release 14), Nov. 2016.
3GPP TR 38.900 V2.0.0 (Jun. 2016), "3rd Generation Partnership Project; Technical Specification Group Radio Access Network; Channel model for frequency spectrum above 6 GHz," (Release 14), Jun. 2016.
3GPP TR 38.912 V0.0.2 (Sep. 2016), "3rd Generation Partnership Project; Technical Specification Group Radio Access Network; Study on New Radio Access Technology," (Release 14), Sep. 2016.
3GPP TR 38.913 V1.0.0 (Oct. 2016), "3rd Generation Partnership Project; Technical Specification Group Radio Access Network; Study on Scenarios and Requirements for Next Generation Access Technologies;" (Release 14), Oct. 2016.
ZTE et al.,"Discussion on the UP architecture for the new QoS framework", Agenda Item: 3.2.1.3, 3GPP TSG-RAN WG2 NR Meeting Ad Hoc, R2-1700159, Spokane, USA, Jan. 17-19, 2017.
Sequans Communications ,"PDCP operation for NR", Agenda Item: 10.3.3.2, 3GPP TSG-RAN WG2 Meeting #97bis, R2-1703632, Spokane, USA, Apr. 3-7, 2017.
Huawei et al., "A New Protocol Layer for QoS Flow to DRB Mapping", Agenda Item: 3.2.1.3, 3GPP TSG-RAN WG2 NR Meeting Ad Hoc, R2-1700088, Spokane, USA, Jan. 17-19, 2017.
Extended European search report with supplementary European search report and the European search opinion issued by the

(56) References Cited

OTHER PUBLICATIONS

European Patent Office for corresponding European Patent Application No. 17905517.3, mailed on Mar. 3, 2020.
Notice of Reasons for Refusal issued by Japan Patent Office for Japanese Patent Application No. 2019-512145 mailed Sep. 15, 2020, with a full machine English translation.
Decision of Dismissal of Amendment issued by the Japan Patent Office for corresponding Japanese Patent Application No. 2019-512145, mailed Oct. 5, 2021, with full machine English translation.
Communication pursuant to Article 94(3) EPC issued by the European Patent Office for corresponding European Patent Application No. 17 905 517.3-1215, dated Oct. 12, 2021.
Notice of Termination of Reconsideration by Examiners before Appeal Proceedings along with Reconsideration Report by Examiner before Appeal, issued by the Japan Patent Office for Japanese Patent Application No. 2019-512145 and mailed on Feb. 22, 2022, with a full machine English translation.
CMCC, "Introducing Transmission Mode for PDCP Operation", Agenda Item: 10.2.3.1, 3GPP TSG-RAN WG2 Meeting #97bis, R2-1702925, Spokane, USA, Apr. 3-7, 2017.
Ericsson, "Logical Channel Prioritization with short TTI", Agenda Item: 9.2.2 Short TTI aspects, 3GPP TSG-RAN WG2 Meeting #97bis, Tdoc R2-1703210, Spokane, USA, Apr. 3-7, 2017.
CATT, "Multiplexing of URLLC and eMBB traffic in UL", Agenda Item: 8.1.3.3.6, 3GPP TSG-RAN WG1 Meeting #88bis, R1-1704587, Spokane, USA, Apr. 3-7, 2017.
Mediatek Inc., "On some open issues related to reflective QoS", Agenda Item: 10.3.4.2, 3GPP TSG-RAN WG2 Meeting #97bis, R2-1703530, Spokane, USA, Apr. 3-7, 2017.
Notice of Reasons for Refusal issued by the Japan Patent Office for corresponding Japanese Patent Application No. 2021-047865, dated Apr. 5, 2022, with a full English machine translation.
First Notification of Office Action and Search Report issued by the China National Intellectual Property Administration for corresponding Chinese Patent Application No. 201780089537.1, dated Sep. 28, 2022, with an English translation.
Notice of Reasons for Refusal issued by the Japan Patent Office for corresponding Japanese Patent Application No. 2019-512145, mailed on Sep. 13, 2022, with an English translation.
Notice of Reasons for Refusal issued by the Japan Patent Office for corresponding Japanese Patent Application No. 2019-512145, dated Dec. 20, 2022, with an English translation.
Non-Final Office Action issued by the United States Patent and Trademark Office for corresponding U.S. Appl. No. 16/596,382, electronically delivered on Mar. 25, 2021.
Final Office Action issued by the United States Patent and Trademark Office for corresponding U.S. Appl. No. 16/596,382, electronically delivered on Dec. 27, 2021.
Non-Final Office Action issued by the United States Patent and Trademark Office for corresponding U.S. Appl. No. 16/596,382, electronically delivered on Jul. 21, 2022.
Notice of Allowance issued by the United States Patent and Trademark Office for corresponding U.S. Appl. No. 16/596,382, electronically delivered on Feb. 24, 2023.
Huawei, HiSilicon, "RLC Operation Modes," 3GPP TSG-RAN2 NR Ad Hoc, Agenda item: 3.2.1.1, R2-1700081, Jan. 17-19, 2017, Spokane, USA (Cited in International Search Report mailed on Jul. 11, 2017 for corresponding International Application No. PCT/JP2017/015272).
Samsung, "T-reordering in NR RLC UM," 3GPP TSG-RAN2 Meeting NR Ad Hoc Agenda item: 3.2.1.5, R2-1700499, Jan. 17-19, 2017, Spokane, USA (Cited in International Search Report mailed on Jul. 11, 2017 for corresponding International Application No. PCT/JP2017/015272).
ZTE, ZTE Microelectronics, "Discussion on the UP architecture for the new QoS framework," 3GPP TSG-RAN WG2, NR Ad Hoc, Agenda item: 3.2.1.3, R2-1700159, FS_NR_newRAT—Release 14, Jan. 19, 2017, Spokane, USA (Cited in International Search Report mailed on Jul. 11, 2017 for corresponding International Application No. PCT/JP2017/015272).
International Search Report issued by the International Search Authority for corresponding International Patent Application No. PCT/JP2017/015272, with full English translation.
Written Opinion issued by the International Search Authority for corresponding International Patent Application No. PCT/JP2017/015272, dated Jul. 11, 2017, with partial English translation.

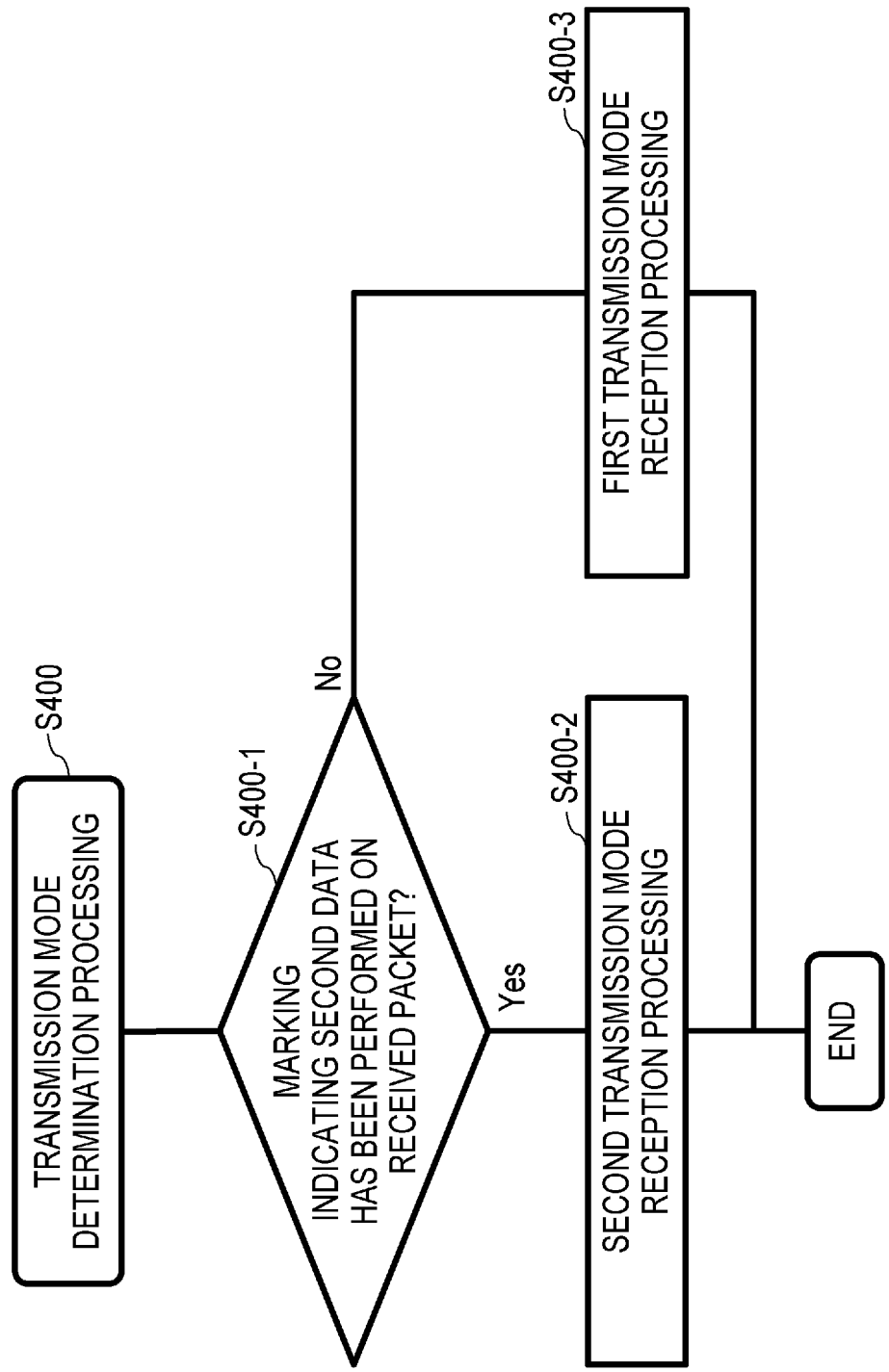

WIRELESS COMMUNICATION DEVICE, METHOD, AND SYSTEM FOR WIRELESS CONNECTION USING A PACKET INCLUDING TRANSMISSION NUMBER

CROSS-REFERENCE TO RELATED APPLICATION

This application is a continuation application of U.S. application Ser. No. 16/596,382 filed on Oct. 8, 2019, which is a continuation application of International Application Number PCT/JP2017/015272 filed on Apr. 14, 2017 and designated the U.S., the entire contents of each are incorporated herein by reference.

FIELD

The present disclosure relates to a wireless communication device, a wireless communication method, and a wireless communication system.

BACKGROUND

In present networks, the traffic of mobile terminals (smartphones and future phones) occupy the greater part of network resources. Moreover, the traffic used by mobile terminals tends to increase in the future.

On the other hand, with development of IoT (Internet of a things) service (for example, a monitoring system of a transportation system, a smart meter, a device, and the like), it is requested to cope with services having diverse requirements. Therefore, in the next-generation (for example, 5G (the fifth-generation cellular communication) communication standards, technologies for realizing a higher data rate, a lager capacity, and a lower latency in addition to the 4G (the fourth-generation cellular communication) standard technologies are required. In the next-generation communication standards, technical discussions have progressed in the 3GPP working groups (for example, TSG-RAN WG1, TSG-RAN WG2, and the like).

As described above, in order to cope with a wide variety of services, the next-generation communication standards (for example, 5G) plan to support many use cases classified into eMBB (Enhanced Mobile BroadBand), Massive MTC (Machine Type Communications), and URLLC (Ultra-Reliable and Low Latency Communication).

Moreover, in communication standards of a wireless communication system, specifications are defined as protocol stacks which divide functions of wireless communication into a series of layers. For example, a physical layer is defined as a first layer, a data link layer is defined as a second layer, and a network layer is defined as a third layer. In the fourth-generation cellular communication system such as LTE, the second layer is divided into a plurality of sublayers including an MAC (Medium Access Control) layer, an RLC (Radio Link Control) layer, and a PDCP (Packet Data Convergence Protocol) layer. Moreover, in the fourth-generation cellular communication system, the first layer is made up of a PHY (Physical) layer and the third layer is made up of an RRC (Radio Resource Control) layer (the RRC layer supports only the control plane). Since the MAC layer, the RLC layer, and the PDCP layers are the sublayers of the second layer as described above, these may be referred to as an MAC sublayer, an RLC sublayer, and a PDCP sublayer.

Each layer of a transmission device of a wireless communication system performs processing pursuant to a predetermined protocol such as appending a header to a data block (also referred to as a service data unit (SDU)) transmitted from a higher layer to generate a PDU (Protocol Data Unit) which is an information unit exchanged between peer processes in a receiving device, and transmits the PDU to a lower layer. For example, the RLC layer of LTE uses a PDCP-PDU which is a data block from a PDCP layer which is a higher layer as an RLC-SDU and connects a plurality of RLC-SDUs in a range falling within a TB (Transport Block) length notified from a lower layer, for example, to thereby generate an RLC-PDU. Such an RLC-PDU is transmitted to an MAC layer which is a lower layer in a state in which an RLC header having a sequence number (SN) in the RLC layer is appended thereto.

Each layer of a receiving device of a wireless communication system receives a data block (also referred to as a PDU) from a lower layer and transmits a data block (also referred to as an SDU) extracted, for example, by removing the header therefrom to a higher layer. For example, an RLC of LTE performs processing of reconstructing a plurality of RLC-SDUs stored in one RLC-PDU, for example, by referring to an RLC header appended to a data block (also referred to as an MAC-SDU or an RLC-PDU) from an MAC layer which is a lower layer and transmits the RLC-SDU to a PDCP layer. In this case, in order to compensate for the order of the RLC-SDU with respect to a higher layer, reordering processing based on the RLC sequence number included in the RLC header during reconstruction of the RLC-SDU. Moreover, when missing in the RLC sequence number is detected, RLC re-transmission control requesting re-transmission of the RLC-PDU is executed with respect to a transmission device.

CITATION LIST

Non-Patent Literature

Non Patent Literature 1: 3GPP TS 36.211 V 14.1.0 (2017-01)
Non Patent Literature 2: 3GPP TS 36.212 V 14.1.1 (2017-01)
Non Patent Literature 3: 3GPP TS 36.213 V 14.1.0 (2017-01)
Non Patent Literature 4: 3GPP TS 36.300 V 14.1.0 (2016-12)
Non Patent Literature 5: 3GPP TS 36.321 V 14.1.0 (2016-12)
Non Patent Literature 6: 3GPP TS 36.322 V 13.2.0 (2016-07)
Non Patent Literature 7: 3GPP TS 36.323 V 14.1.0 (2016-12)
Non Patent Literature 8: 3GPP TS 36.331 V 14.1.0 (2017-01)
Non Patent Literature 9: 3GPP TS 36.413 V 14.1.0 (2017-01)
Non Patent Literature 10: 3GPP TS 36.423 V 14.1.0 (2017-01)
Non Patent Literature 11: 3GPP TS 36.425 V 13.1.1 (2016-09)
Non Patent Literature 12: 3GPP TR 38.801 V 1.0.0 (2016-12)
Non Patent Literature 13: 3GPP TR 38.802 V 1.1.0 (2017-01)
Non Patent Literature 14: 3GPP TR 38.803 V 1.1.0 (2017-01)
Non Patent Literature 15: 3GPP TR 38.804 V 0.4.0 (2016-12)

Non Patent Literature 16: 3GPP TR 38.900 V 2.0.0 (2016-06)

Non Patent Literature 17: 3GPP TR 38.912 V 0.0.2 (2016-09)

Non Patent Literature 18: 3GPP TR 38.913 V 1.0.0 (2016-10)

SUMMARY

A wireless communication device that transmits data to another wireless communication device that performs wireless connection using a packet including a transmission number, the wireless communication device includes, a controller configured to classify the data as first data when a transmission condition indicating a condition related to transmission of the data is a first transmission condition and classifies the data as second data when the transmission condition of the data is a second transmission condition different from the first transmission condition, and a transmitter configured to transmit the data in a first transmission mode in a layer related to the wireless connection when the data is the first data and transmits the data in a second transmission mode in a layer related to the wireless connection when the second data is second data.

The object and advantages of the invention will be realized and attained by means of the elements and combinations particularly pointed out in the claims.

It is to be understood that both the foregoing general description and the following detailed description are exemplary and explanatory and are not restrictive of the disclosure.

BRIEF DESCRIPTION OF DRAWINGS

FIG. 16 is a diagram illustrating an example of a processing flowchart of transmission mode determination processing S400.

DESCRIPTION OF EMBODIMENTS

Figure 1:
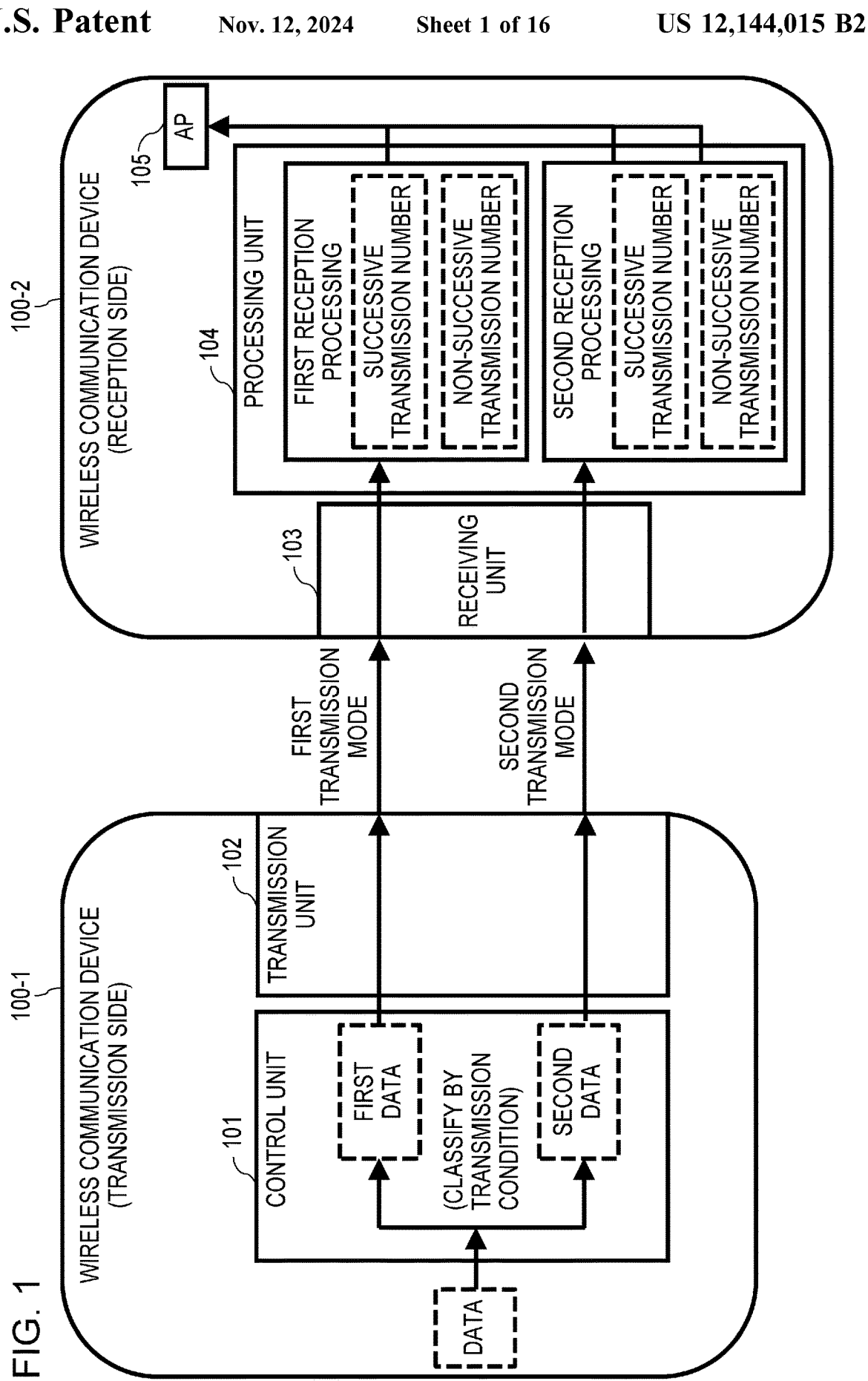
FIG. 1 is a diagram illustrating a configuration example of a wireless communication system according to a first embodiment.

Embodiments will be described in detail below with reference to the figures. Problems and embodiments described in the present specification are examples, and do not limit the scope of rights of the present application. More particularly, even if expressions used in the description vary, as long as the various expressions mean technically the same matters, the technology of the present application can be applied on the basis of these different expressions without limiting the scope of rights.

In the next-generation communication system such as 5G, various use cases are taken into consideration as described above. Transmission/reception processing in respective layers for coping with the various use cases considered (for example, transmission/reception processing in respective layer for coping with a plurality of pieces of data (for example, eMBB data and URLLC data) of which the allowable latencies are different) is requested.

First Embodiment

First, a first embodiment will be described.

A wireless communication system 10 of the first embodiment includes wireless communication devices 100-1 and 100-2. The wireless communication device 100-1 is a transmission-side wireless communication device that transmits data and the wireless communication device 100-2 is a reception-side wireless communication device that receives data.

The wireless communication device 100-1 transmits data to the wireless communication device 100-2 that performs wireless connection using a packet including a transmission number which is a successive number indicating a transmission order. Moreover, the wireless communication device 100-1 includes a controller that classifies data as first data when a transmission condition indicating a condition related to transmission of the data is a first transmission condition and classifies the data as second data when the transmission condition of the data is a second transmission condition different from the first transmission condition. Furthermore, the wireless communication device 100-1 transmits the data in a first transmission mode in a layer related to the wireless connection when the data is the first data and transmits the data in a second transmission mode in a layer related to the wireless connection when the data is second data.

The wireless communication device 100-2 receives data transmitted using a packet including a transmission number from the wireless communication device 100-1 that performs wireless connection. Moreover, the wireless communication device 100-2 includes a receiving unit that transmits a packet including data. Furthermore, the wireless communication device 100-2 includes a processing unit that performs first reception processing when the received packet is transmitted in a first transmission mode and performs second reception processing when the received packet is transmitted in a second transmission mode. In the first reception processing, the processing unit executes processing corresponding to the data included in the received packet when a packet of a transmission number successive to a packet received in advance is received and does not execute processing corresponding to the data included in the received packet when a packet of a transmission number that is not successive to the packet received in advance is received. Moreover, in the second reception processing, the processing unit executes the processing corresponding to the data included in the received packet when a packet of a transmission number that is successive to or not successive to the packet received in advance is received (that is, regardless of the transmission number of the received packet).

FIG. 1 is a diagram illustrating a configuration example of the wireless communication system 10 according to the first embodiment. The wireless communication system 10 includes the wireless communication devices 100-1 and 100-2. The wireless communication devices 100-1 and 100-2 are connected wirelessly and perform transmission and reception of data using a packet, for example. The wireless communication device 100-1 is a base station device, for example. The wireless communication device 100-2 is a terminal device such as a mobile phone or a computer such as a server or a host machine, for example. Moreover, for example, the wireless communication device 100-1 may be a terminal device or a computer and the wireless communication device 100-2 may be a base station device. Furthermore, the wireless communication devices 100-1 and 100-2 may have the configuration of both devices of the reception-side wireless communication device (the wireless communication device 100-1 in FIG. 1) and the reception-side wireless communication device (the wireless communication device 100-2 in FIG. 1), for example.

The wireless communication devices 100-1 and 100-2 perform communication on the basis of TCP (Transmission Control Protocol)/IP (Internet Protocol). Moreover, the wireless communication devices 100-1 and 100-2 include a processor, a storage, and a memory which are not illustrated, construct a controller 101, a transmission unit (transmitter) 102, a receiving unit 103, and a processing unit 104, and execute respective processes by loading a program stored in the storage onto the memory and executing the loaded program with the aid of the processor.

The wireless communication device 100-1 generates data to be transmitted to the wireless communication device 100-2 or receives the data from another device and starts data transmission processing. The control unit (controller) 101 classifies data as first data when a transmission condition is a first transmission condition and classifies the data as second data when the transmission condition of the data is a second transmission condition different from the first transmission condition.

The transmission condition is a condition related to a transmission time such as the time taken until data reaches the wireless communication device 100-2 which is a transmission destination. When the transmission condition is a condition related to a transmission time, the transmission condition is an allowable latency indicating an allowable time taken until data reaches an application program (for example, included in the wireless communication device 100-2) that uses data to be transmitted, for example.

Moreover, the transmission condition may be the degree of importance or urgency of data, for example. The degree of importance or urgency may be set by a device or an application program that generates data, for example, and be included in a portion of data or a header part for transmitting data.

The first data and the second data are classified by a difference in transmission condition. For example, the second data is data having a higher degree of urgency than the first data. Moreover, for example, an allowable latency of the second data is shorter than an allowable latency of the first data.

The control unit 101 classifies data as first data, for example, when the allowable latency (the transmission condition) is smaller than a predetermined threshold (the first transmission condition). Moreover, the control unit 101 classifies data as second data, for example, when the allowable latency (the transmission condition) is equal to or larger than the predetermined threshold (the second transmission condition).

The transmission unit 102 transmits the data in a first transmission mode in a layer related to wireless connection when the data is the first data and transmits the data in a second transmission mode in the layer related to the wireless connection when the data is the second data.

The layer related to wireless connection is an RLC layer which is one of data link layers (second layers), for example. The RLC layer is a layer that manages a transmission order of a packet using a sequence number and controls retransmission of a packet, for example.

The transmission mode is a transmission mode related to an ACK (acknowledgement) packet which is an acknowledgement for notifying a transmission source device of the fact that a data-reception-side device has received the data when the layer related to wireless connection is an RLC layer, for example. For example, the first transmission mode is AM (Acknowledged Mode). AM is a transmission mode in which a reception-side device is requested to transmit ACK. On the other hand, for example, the second transmission mode is UM (Unacknowledged Mode). UM is a transmission mode in which a reception-side device is not requested to transmit ACK. In AM and UM, for example, the time (transmission completion time) taken until a transmission-side device recognizes completion of transmission of data is different. In AM, the transmission-side device does not recognize the completion of transmission until ACK for the transmitted data is received. On the other hand, in UM, the transmission-side device recognizes the completion of transmission when data was transmitted. That is, since data can be transmitted in UM in a smaller number of procedure than in AM, UM is appropriate for transmitting data having a short transmission completion time (for example, a high degree of urgency).

The second transmission mode may be TM (Transparent Mode). TM is a mode in which data passes through a RLC layer itself and is a transmission mode in which a reception-side device is not requested to transmit ACK similarly to UM.

For example, the transmission unit 102 transmits the first data in AM (the first transmission mode) and transmits the second data having a shorter allowable latency than the first data in UM (the second transmission mode). In this way, it is possible to use a different transmission mode depending on the property (the transmission condition) of data to be transmitted and to transmit data in an appropriate transmission mode.

The receiving unit 103 of the wireless communication device 100-2 receives data transmitted in the first transmission mode or the second transmission mode. The processing unit 104 performs first reception processing when the received packet is transmitted in the first transmission mode.

In the first reception processing, the processing unit 104 executes processing corresponding to data included in the received packet when a packet of a transmission number successive to a packet received in advance is received and does not execute processing corresponding to the data included in the received packet when a packet of a transmission number that is not successive to the packet received in advance is received. For example, the packet received in advance is a packet transmitted most lately (that is, having the largest transmission number) among packets on which processing corresponding to data included in the packet has been executed.

The processing corresponding to data is processing of delivering the received data to an application program which is included in the wireless communication device 100, for example, and which uses the data. The application program is an AP (Application Program) 105 in FIG. 1. Moreover, for example, the processing corresponding to the data may be processing of delivering data to a higher layer (for example, an RRC layer on the third layer) when a layer related to wireless connection is an RLC layer.

For example, the wireless communication device 100-2 receives packets in the order of transmission numbers 1, 2, 5, 4, and 3 in the first reception processing. In this case, the wireless communication device 100-2 receives the packets of the transmission numbers 1 and 2 in the transmission order and delivers the data of the transmission numbers 1 and 2 to the AP 105. Although the wireless communication device 100-2 receives the packet of the transmission number 5 subsequently, the wireless communication device 100-2 reserves data of the packet of the transmission number 5 since the transmission number 5 is not successive to the transmission number 2 of the packet having the largest transmission number (the packet received in advance) among the packets of which the data has been delivered to the AP 105. Similarly, the wireless communication device 100-2 reserves the data of the packet of the transmission number 4. Upon receiving the packet of the transmission number 3, the wireless communication device 100-2 delivers the data of the packet of the transmission number 3 and the reserved packets of the transmission numbers 4 and 5 to the AP 105 since the transmission numbers of the packets are successive to the transmission number 2 of the packet received in advance.

Moreover, the processing unit 104 performs the second reception processing when the received packet is transmitted in the second transmission mode.

In the second reception processing, the processing unit 104 executes processing corresponding to the data included in the received packet when a packet of a transmission number that is successive to or not successive to the packet received in advance.

For example, in the second reception processing, the wireless communication device 100-2 receives a packet of the transmission number 4. However, it is assumed that the wireless communication device 100-2 has received the packets of the transmission numbers 1 and 2 in the first transmission mode. In this case, the wireless communication device 100-2 delivers the data of the packet of the transmission number 4 to a target application program even if the transmission number 4 of the received packet is not successive to the packet of the transmission number 2 received in advance.

That is, the wireless communication device 100-2 delivers a received packet to the AP 105 if the transmission number of the received packet is a successive number when the packet is received in the first transmission mode and reserves the received packet without delivering the same to the AP 105 and waits for reception of a packet of a successive number if the transmission number of the received packet is a non-successive number. On the other hand, when a packet transmitted in the second transmission mode is received, the wireless communication device 100-2 delivers data to the AP 105 without waiting for reception of another packet regardless of the transmission number. In this way, for example, even when re-transmission of a packet is waited for due to missing in a radio segment of a packet transmitted in the first transmission mode, the wireless communication device can execute processing (for example, processing of delivering data to an application program) of delivering data transmitted in the second transmission mode preferentially.

Second Embodiment

Figure 2:
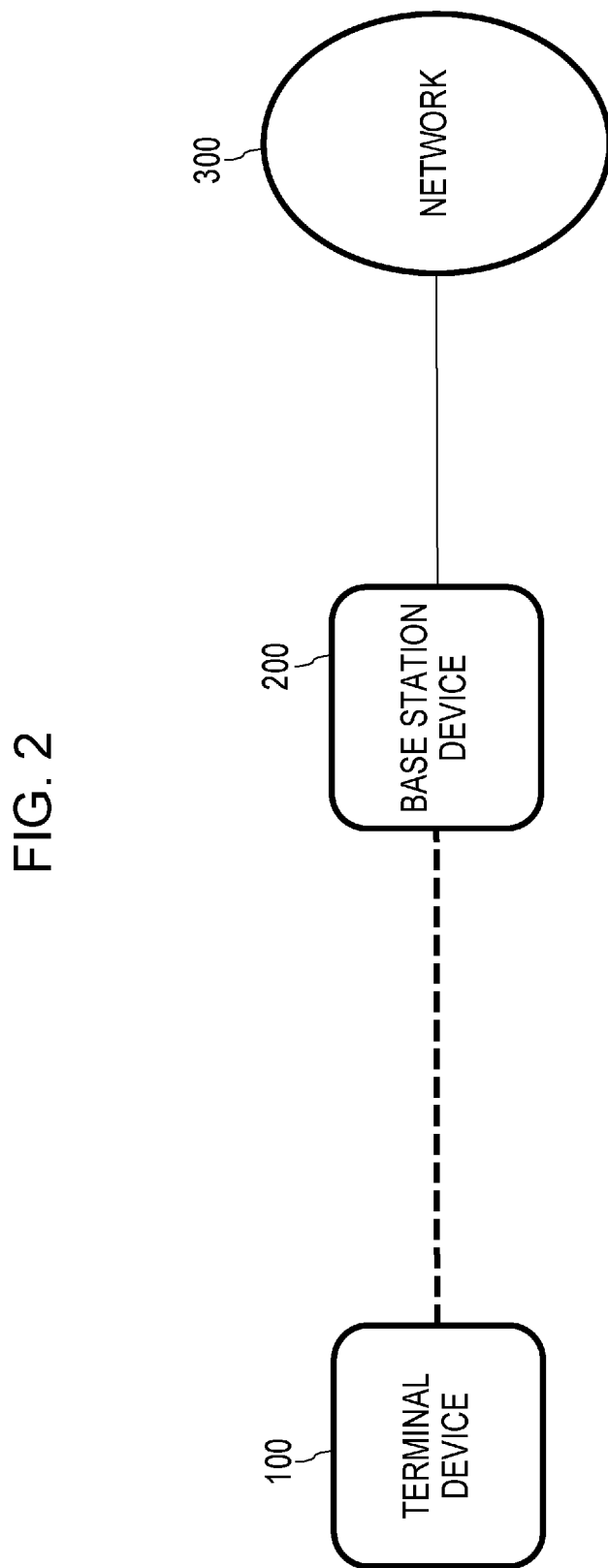
FIG. 2 is a diagram illustrating a configuration example of a wireless communication system 10.

Next, a second embodiment will be described.
<Configuration Example of Communication System>
FIG. 2 is a diagram illustrating a configuration example of the wireless communication system 10. The wireless communication system 10 includes a terminal device 100, a base station device 200, and a network 300. The wireless communication system 10 is a communication system corresponding to LTE (Long Term Evolution) communication standards, for example.

The terminal device 100 is a wireless communication device such as, for example, a mobile terminal or a computer. For example, the terminal device 100 wirelessly connects to the base station device 200 and communicates with the network 300 via the base station device 200. The terminal device 100 downloads data and receives services from the base station device 200 or the network 300. Moreover, the terminal device 100 communicates with the base station device 200 and the network 300 on the basis of TCP/IP, for example.

The base station device 200 is a wireless communication device that relays packets transmitted and received by the terminal device 100. The base station device 200 is a base station device such as an eNodeB (evolved Node B) in LTE, for example. Moreover, the base station device 200 may be a network device such as a switch or a router. Furthermore, the base station device 200 may be a wireless communication device that performs wireless communication with the terminal device 100.

The network 300 may be the Internet and may be an intranet formed by a dedicated line.

Figure 3:
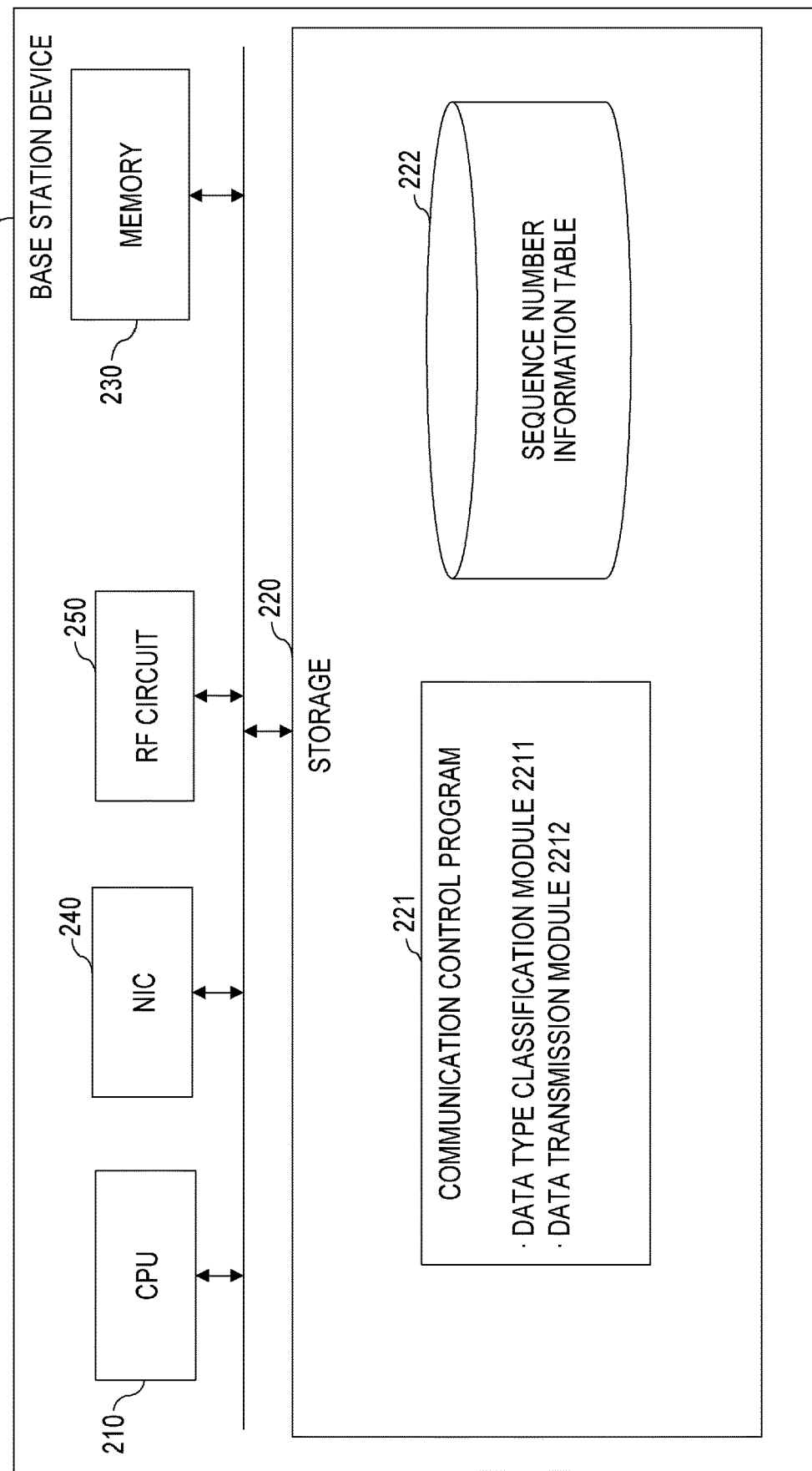
FIG. 3 is a diagram illustrating a configuration example of a base station device 200.

The second embodiment is an example in which the base station device 200 receives data from the network 300 and transmits the received data to the terminal device 100. However, data may be transmitted from the terminal device 100 to the base station device 200.
<Configuration Example of Base Station Device>
FIG. 3 is a diagram illustrating a configuration example of the base station device 200. The base station device 200 includes a CPU (Central Processing Unit) 210, a storage 220, a memory 230 such as a DRAM (Dynamic Random Access Memory), an NIC (Network Interface Card) 240, and an RF (Radio Frequency) circuit 250.

The storage 220 is an auxiliary storage device such as a flash memory, a HDD (Hard Disk Drive), or an SSD (Solid Stage Drive) that stores programs and data. The storage 220 stores a communication control program 221 and a transmission-side sequence number information table 222.

The transmission-side sequence number information table 222 is a table that stores a sequence number assigned to a transmitted packet is stored. The base station device 200 stores a sequence number of the last transmitted packet, for example, in the transmission-side sequence number information table 222.

The memory 230 is an area on which a program stored in the storage 220 is loaded. Moreover, the memory 230 may be used as an area in which a program stores data.

The NIC 240 is a network interface connected to the network 300. The base station device 200 relays communication of the terminal device 100 by transmitting and receiving packets to another communication device and the network 300 via the NIC 240.

The RF circuit 250 is a device that performs wireless communication (wireless connection) with the terminal device 100. The RF circuit 250 has an antenna, for example, and receives packets (electric waves) transmitted by the terminal device 100 and transmits packets (electric waves) to the terminal device 100.

The CPU 210 is a processor that loads a program stored in the storage 220 onto the memory 230 and executes the loaded program to realizes respective processes.

The CPU 210 performs communication control processing by executing the communication control program 221. The communication control processing is processing of relaying communication performed by the terminal device 100 or performing communication with the terminal device 100. In the communication control processing, the base station device 200 transmits a packet received from the terminal device 100 to a transmission destination of the packet, for example. Moreover, in the control application, the base station device 200 receives a packet addressed to the terminal device 100 from the network 300 and transmits the received packet to the terminal device 100, for example.

The CPU 210 constructs a control unit by executing a data type classification module 2211 included in the communication control program 221 and performs data type classification processing. The data type classification processing is processing of classifying a data type of data to be transmitted to the terminal device 100. The data type is a type for identifying a transmission mode for transmitting data, and data to be transmitted in the first transmission mode is referred to as first data and data to be transmitted in the second transmission mode is referred to as second data. In the data type classification processing, the base station device 200 classifies a data type on the basis of a transmission condition of data to be transmitted. In the second embodiment, the base station device 200 uses an allowable latency of data as an example of a transmission condition and classifies a data type.

Moreover, the CPU 210 constructs a transmission unit by executing a data transmission module 2212 included in the communication control program 221 and performs data transmission processing. The data transmission processing is processing of transmitting data in a transmission mode corresponding to a data type of data to be transmitted from the base station device 200 to the terminal device 100. The transmission mode indicates a type of a transmission method in a layer (for example, an RLC layer which is one of network layers) related to wireless connection. In the second embodiment, the base station device 200 transmits data using AM as an example of the first transmission mode and using UM as an example of the second transmission mode.

<Configuration Example of Terminal Device>

Figure 4:
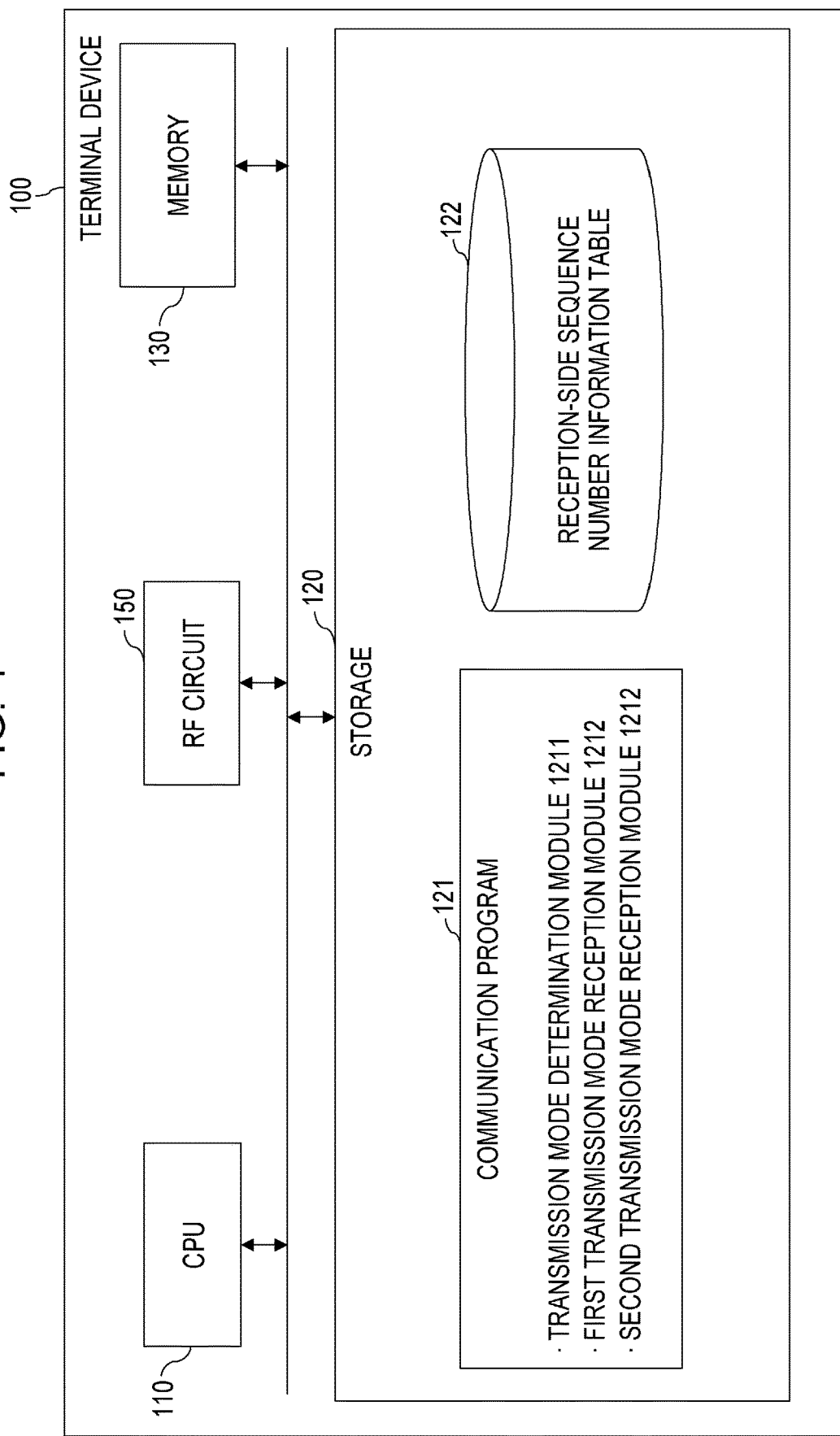
FIG. 4 is a diagram illustrating a configuration example of a terminal device 100.

FIG. 4 is a diagram illustrating a configuration example of the terminal device 100. The terminal device 100 includes a CPU 110, a storage 120, a memory 130 such as a DRAM, and a RF circuit 150.

The storage 120 is an auxiliary storage device such as a flash memory, a HDD, or an SSD that stores programs and data. The storage 120 stores a communication program 121 and a reception-side sequence number information table 122.

The reception-side sequence number information table 122 is a table that stores a sequence number of a received packet. For example, the terminal device 100 stores a sequence number of a packet which was received the last or on which processing corresponding to the last data has been executed and a sequence number of a reserved packet in the reception-side sequence number information table 122. In the second embodiment, processing of delivering data to an application program which uses the data is used as an example of the processing corresponding to data.

The memory 130 is an area on which a program stored in the storage 120 is loaded. Moreover, the memory 130 may be used as an area in which a program stores data.

The RF circuit 150 is a device that performs wireless communication (wireless connection) with the base station device 200. The RF circuit 150 has an antenna, for example, and transmits packets (electric waves) to the base station device 200 and receives packets (electric waves) from the base station device 200.

The CPU 110 is a processor that loads a program stored in the storage 120 onto the memory 130 and executes the loaded program to realizes respective processes.

The CPU 110 performs communication processing by executing the communication program 121. The communication processing is process of communicating with the network 300 via the base station device 200 and communicating with the base station device 200.

The CPU 110 constructs a receiving unit by executing a transmission mode determination module 1211 included in the communication program 121 and performs transmission mode determination processing. The transmission mode determination processing is processing of determining a transmission mode of a packet received by the terminal device 100 and transmitted by the base station device 200. In the second embodiment, the terminal device 100 makes determination using a LCH (Logical Channel) number of a packet as an example of determining the transmission mode of a received packet.

Moreover, the CPU 110 constructs a processing unit by executing a first transmission mode reception module 1212 included in the communication program 121 and performs first transmission mode reception processing. The first transmission mode reception processing is processing of delivering data of a received packet to a target application or reserving the data on the basis of a sequence number of the packet received by the terminal device 100.

Furthermore, the CPU 110 constructs a processing unit by executing a transmission mode reception module 1213 included in the communication program 121 and performs second transmission mode reception processing. The second transmission mode reception processing is processing of delivering data of a received packet to a target application regardless of a sequence number of the packet received by the terminal device 100.

<Data Transmission/Reception Processing>

Figure 5:
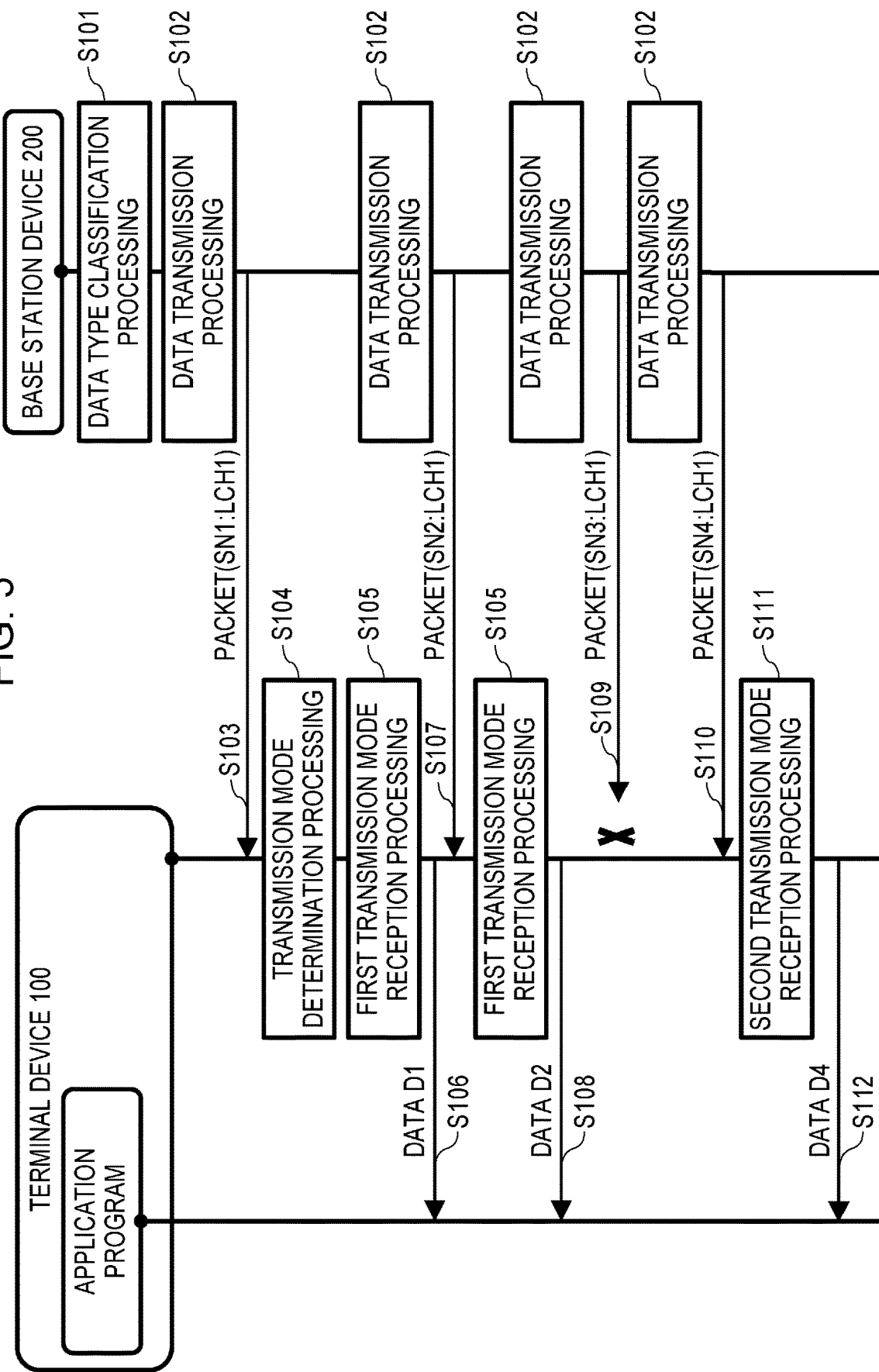
FIG. 5 is a diagram illustrating an example of data transmission/reception processing in the wireless communication system 10.

FIG. 5 is a diagram illustrating an example of data transmission/reception processing in the wireless communication system 10. The sequence of FIG. 5 is an example of a sequence of transmitting data used by an application program included in the terminal device 100 from the base station device 200 to the terminal device 100. The base station device 200 receives data to be transmitted to the terminal device 100 from the network 300 (not illustrated). The base station device 200 receives data transmitted in the order of data D1, D2, D3, and D4. It is assumed that the data D1, D2, and D3 have a data type of first data and the data D4 has a data type of second data.

Upon receiving data D1 addressed to the terminal device 100, the base station device 200 performs data type classification processing (S101).

Figure 6:
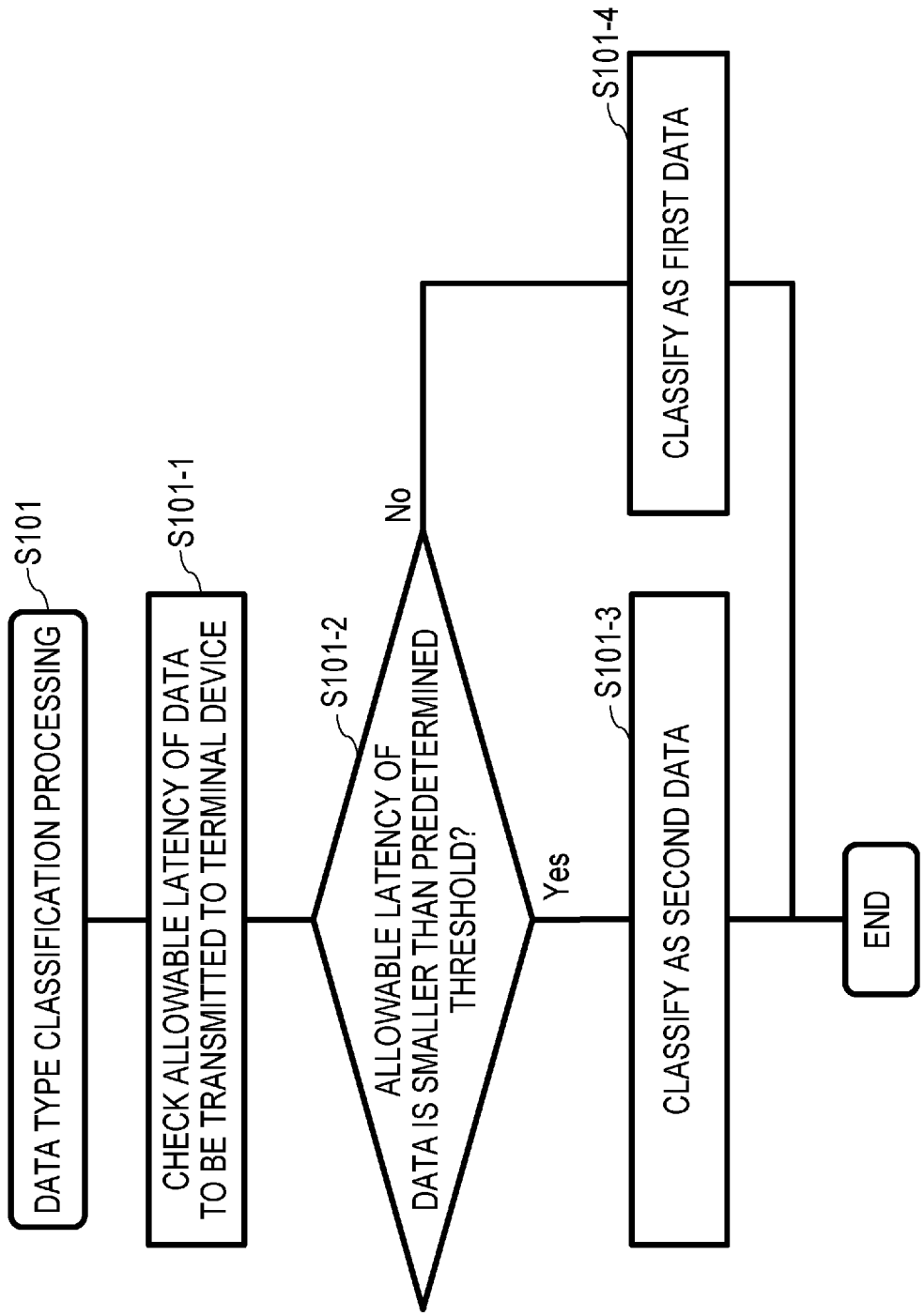
FIG. 6 is a diagram illustrating an example of a processing flowchart of data type classification processing S101.

FIG. 6 is a diagram illustrating an example of a processing flowchart of the data type classification processing S101. The base station device 200 checks an allowable latency of data to be transmitted to the terminal device 100 (S101-1). When the allowable latency of the data is smaller than a predetermined threshold (S101-2: Yes), the base station device 200 classifies the data to be transmitted as second data (S101-3). On the other hand, when the allowable latency of the data is not smaller than the predetermined threshold (S101-2: No), the base station device 200 classifies the data to be transmitted as second data (S101-4). The base station device 200 can classify the degree of urgency of data, for example, by classifying the data type on the basis of an allowable latency.

Returning to the sequence of FIG. 5, the base station device 200 classifies the data D1 as the first data in the data type classification processing S101 (S101-4 in FIG. 6) and performs data transmission processing (S102).

Figure 7:
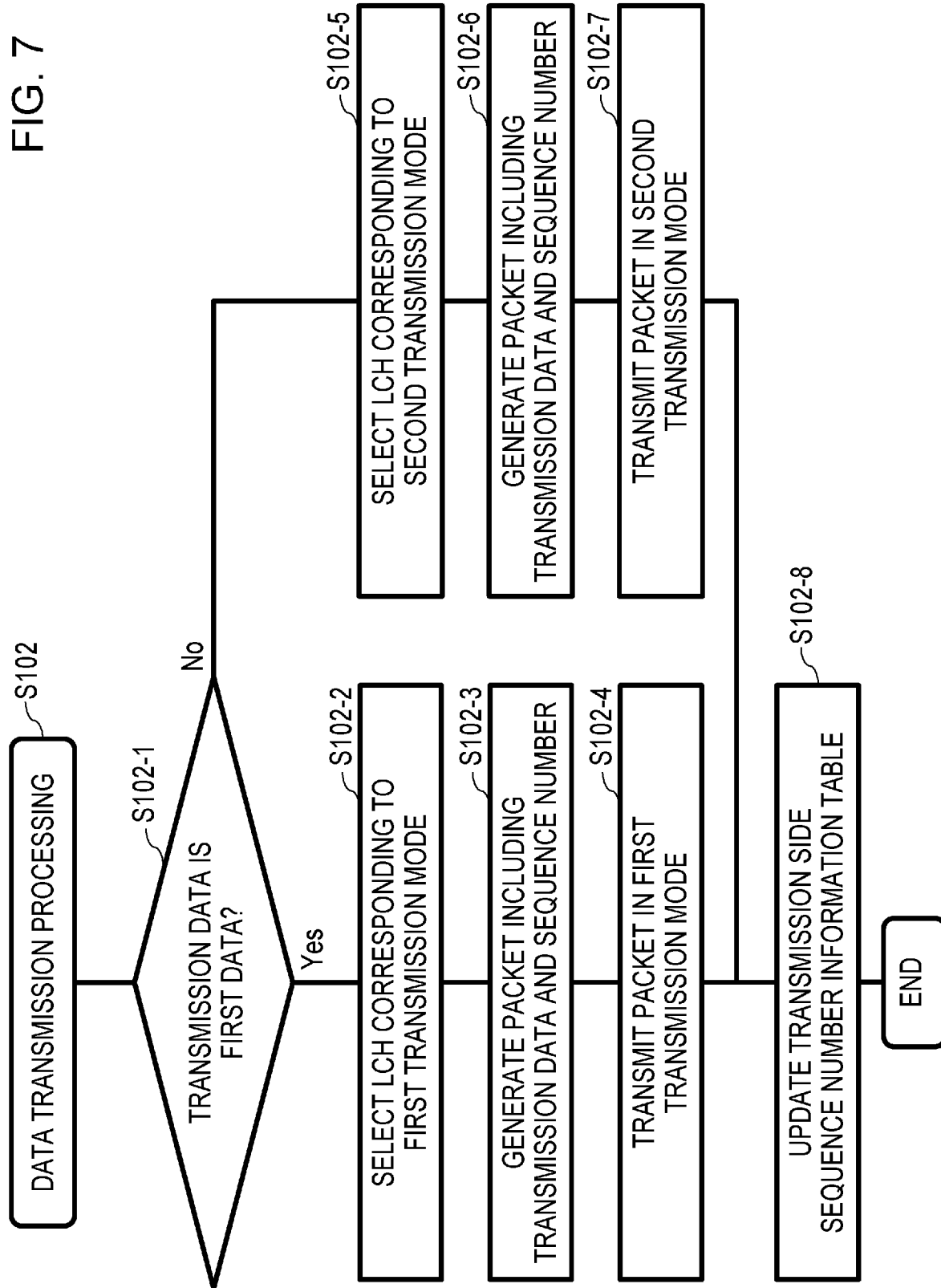
FIG. 7 is a diagram illustrating an example of a processing flowchart of data transmission processing S102.

FIG. 7 is a diagram illustrating an example of a processing flowchart of the data transmission processing S102. When the data to be transmitted is the first data (S102-1: Yes), the base station device 200 selects an LCH corresponding to the first transmission mode (S102-2). When the LCH corresponding to the first transmission mode is not set, the base station device 200 generates a new LCH corresponding to the first transmission mode. The base station device 200 generates a packet including transmission data and a sequence number (S102-3) and transmits the generated packet in the first transmission mode (S102-4).

On the other hand, when the data to be transmitted is the second data (S102-1: No), the base station device 200 selects an LCH corresponding to the second transmission mode (S102-5). The base station device 200 generates a packet including transmission data and a sequence number (S102-6) and transmits the generated packet in the second transmission mode (S102-7).

Upon transmitting the packet, the base station device 200 updates the transmission-side sequence number information table 222 (S102-8) and ends the processing.

Returning to the sequence of FIG. 5, the base station device 200 performs data transmission processing S102 and transmits a packet to the terminal device 100 (S103). The packet S103 has a sequence number of 1 and an LCH number of 1, for example. Hereinafter, a sequence number x (x is an integer) is sometimes denoted by SNx, and an LCH having an LCH number y (y is an integer) is sometimes denoted by LCHy. For example, since an LCH corresponding to the first transmission mode is LCH1, a packet of SN1 and LCH1 is transmitted in S103.

Upon receiving the packet, the terminal device 100 performs transmission mode determination processing (S104).

Figure 8:
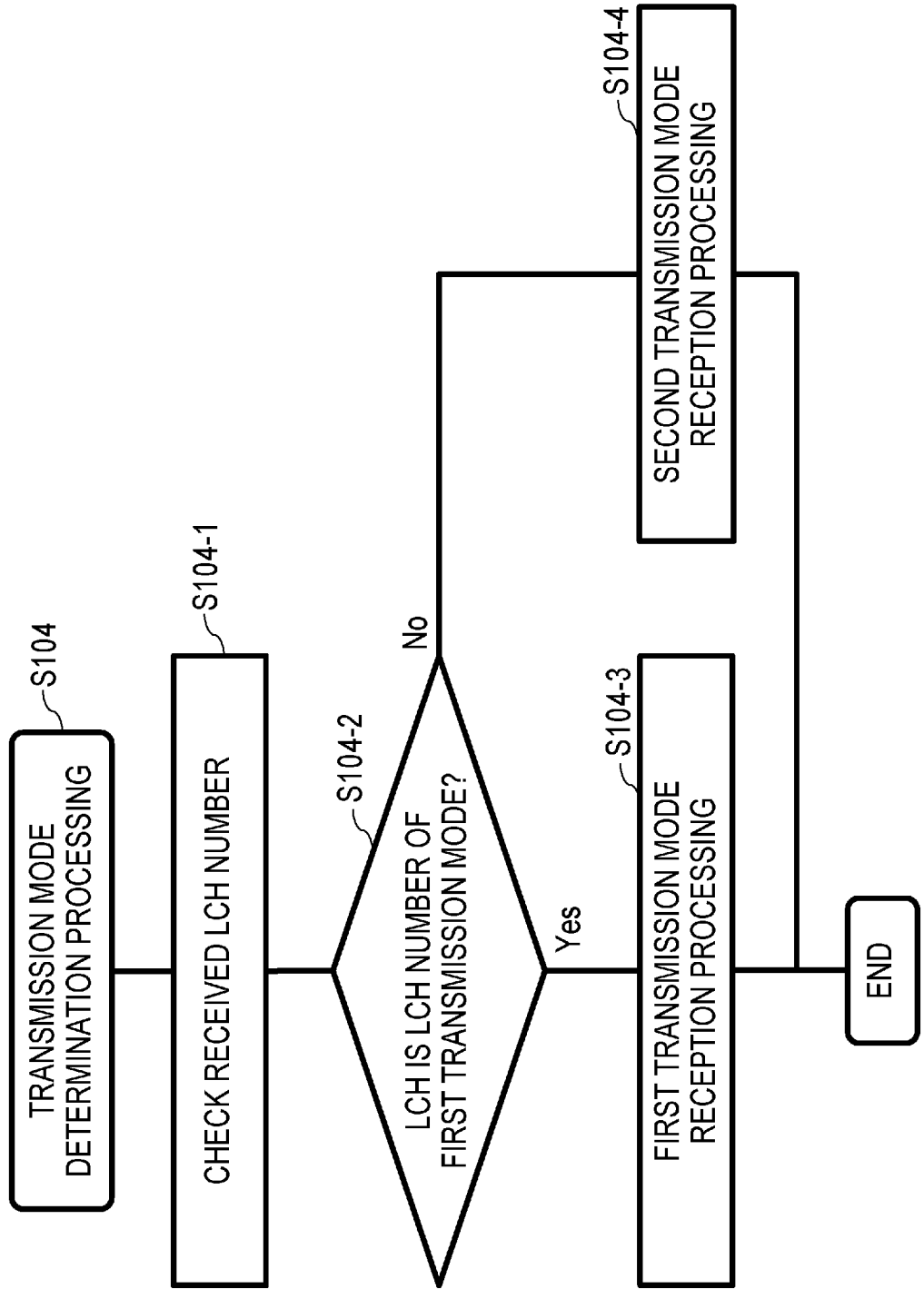
FIG. 8 is a diagram illustrating an example of a processing flowchart of transmission mode determination processing S104.

FIG. 8 is a diagram illustrating an example of a processing flowchart of the transmission mode determination processing S104. The terminal device 100 checks an LCH number of the received packet (S104-1). The terminal device 100 performs the first transmission mode reception processing (S104-3) when the LCH has an LCH number corresponding to the first transmission mode (S104-2: Yes), performs the second transmission mode reception processing (S104-4) when the LCH has an LCH number corresponding to the second transmission mode (S104-2: No), and ends the processing.

Returning to the sequence of FIG. 5, the terminal device 100 performs the transmission mode determination processing S104 and performs the first transmission mode reception processing (S105 and S104-3 in FIG. 8).

Figure 9:
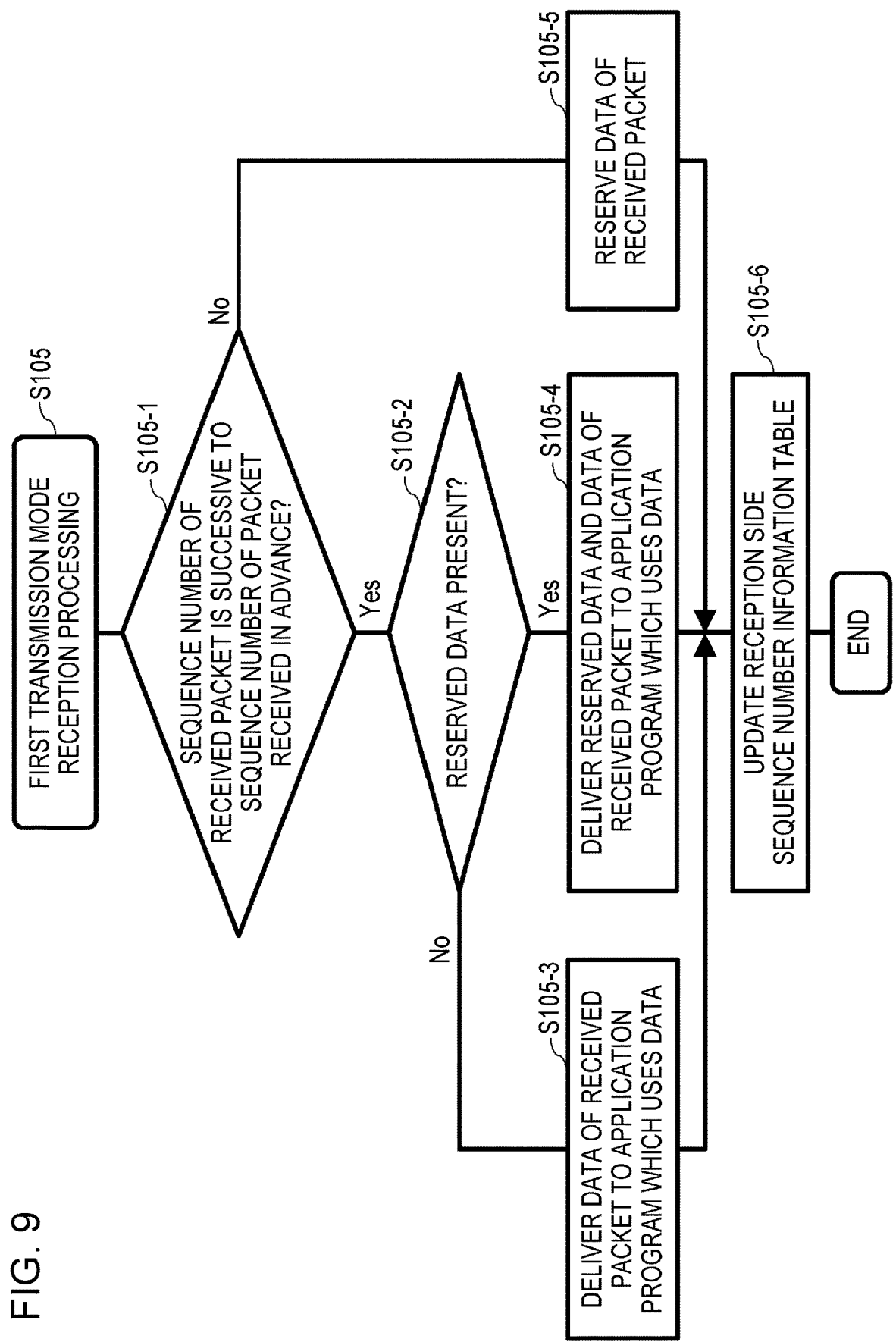
FIG. 9 is a diagram illustrating an example of a processing flowchart of first transmission mode reception processing S105.

FIG. 9 is a diagram illustrating an example of a processing flowchart of the first transmission mode reception processing S105. The terminal device 100 determines whether reserved data is present (S105-2) when a sequence number of the received packet is successive to a sequence number of a packet received in advance (S105-1: Yes).

The terminal device 100 delivers the data of the received packet to the application program (S105-3) when the reserved data is not present (S105-2: No). On the other hand, the terminal device 100 delivers the reserved data and the data of the received packet to the application program (S105-4) when the reserved data is present (S105-2: Yes).

On the other hand, the terminal device 100 reserves the data of the received packet (S105-5) when the sequence number of the received packet is not successive to the sequence number of the packet received in advance (S105-1: No).

The terminal device 100 updates the reception-side sequence number information table 122 (S105-6) and ends the processing.

Returning to the sequence of FIG. 5, in the first transmission mode reception processing S105, since the packet is the packet received the first, the terminal device 100 determines that the sequence number of the packet is successive to the sequence number of the packet received in advance (S105-1 in FIG. 9: Yes) and delivers the data D1 included in the packet to the application program (S106 and S105-3 in FIG. 9) since reserved data is not present (S105-2 in FIG. 9: No).

Subsequently, the base station device 200 performs the data type classification processing S101 whenever a chance to transmit data to the terminal device 100 occurs. However, the data type classification processing S101 is not illustrated in the sequence of FIG. 5. Moreover, subsequently, the terminal device 100 performs the transmission mode determination processing S104 whenever a packet is received. However, the transmission mode determination processing S104 is not illustrated in the sequence of FIG. 5.

The base station device 200 receives the data D2 and D3, performs processing similar to transmission of the packet S103, and transmits the packet of SN2 and LCH1 and the packet of SN3 and LCH1 to the terminal device 100 (S107 and S109).

The terminal device 100 receives the packet S107 and delivers the data D2 included in the packet S107 to the application program (S108) similarly to when the packet S103 was received. However, in the sequence of FIG. 5, for example, the packet S109 does not reach the terminal device 100 due to deterioration in a propagation state in a radio segment, for example.

Upon receiving the data D4 (for example, data of which the allowable latency is smaller than the predetermined threshold) of which the data type is the second data, the base station device 200 selects LCH2 corresponding to the second transmission mode (S102-5 in FIG. 7) and transmits the packet of SN4 and LCH2 to the terminal device 100 (S110 and S102-6 and S102-7 in FIG. 7) in the data transmission processing S102.

Upon receiving the packet S110, the terminal device 100 determines that the LCH2 is an LCH corresponding to the second transmission mode (S104-2 in FIG. 8: No) and performs the second transmission mode reception processing (S111 and S104-4 in FIG. 8).

Figure 10:
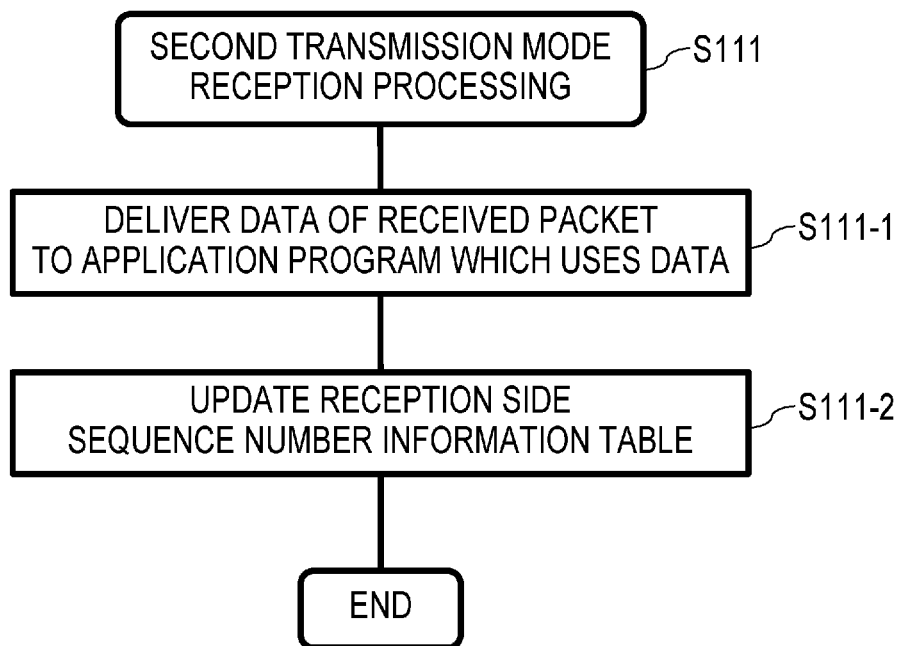
FIG. 10 is a diagram illustrating an example of a processing flowchart of second transmission mode reception processing S111.

FIG. 10 is a diagram illustrating an example of a processing flowchart of the second transmission mode reception processing S111. The terminal device 100 delivers the data of the received packet to the application program (S111-1). Moreover, the reception-side sequence number information table 122 is updated (S111-2). The terminal device 100 delivers data to the application program without determining whether the received sequence numbers are successive in the second transmission mode reception processing S111 (that is, regardless of whether the sequence numbers are successive or not successive).

Returning to the sequence of FIG. 5, the terminal device 100 delivers the data D4 included in the packet S110 to the application program in the second transmission mode reception processing S111 (S112 and S111-1 in FIG. 10).

In the second embodiment, a data-transmission-side device (the base station device 200) uses a different transmission mode in an RLC layer depending on the allowable latency of data to be transmitted. In this way, the data-transmission-side device can transmit data in a transmission mode corresponding to a transmission condition of data and cope with transmission of various types of data. Moreover, when the received was transmitted in a specific transmission mode (the second transmission mode), a data-reception-side device (the terminal device 100) performs processing corresponding to the received data regardless of the sequence number. In this way, upon receiving urgent data having a high degree of urgency to be processed urgently, the data-reception-side device can process the urgent data preferentially even when data transmitted earlier than the urgent data has not been reached.

Third Embodiment

Next, a third embodiment will be described.
<Data Transmission/Reception Processing>

Figure 11:
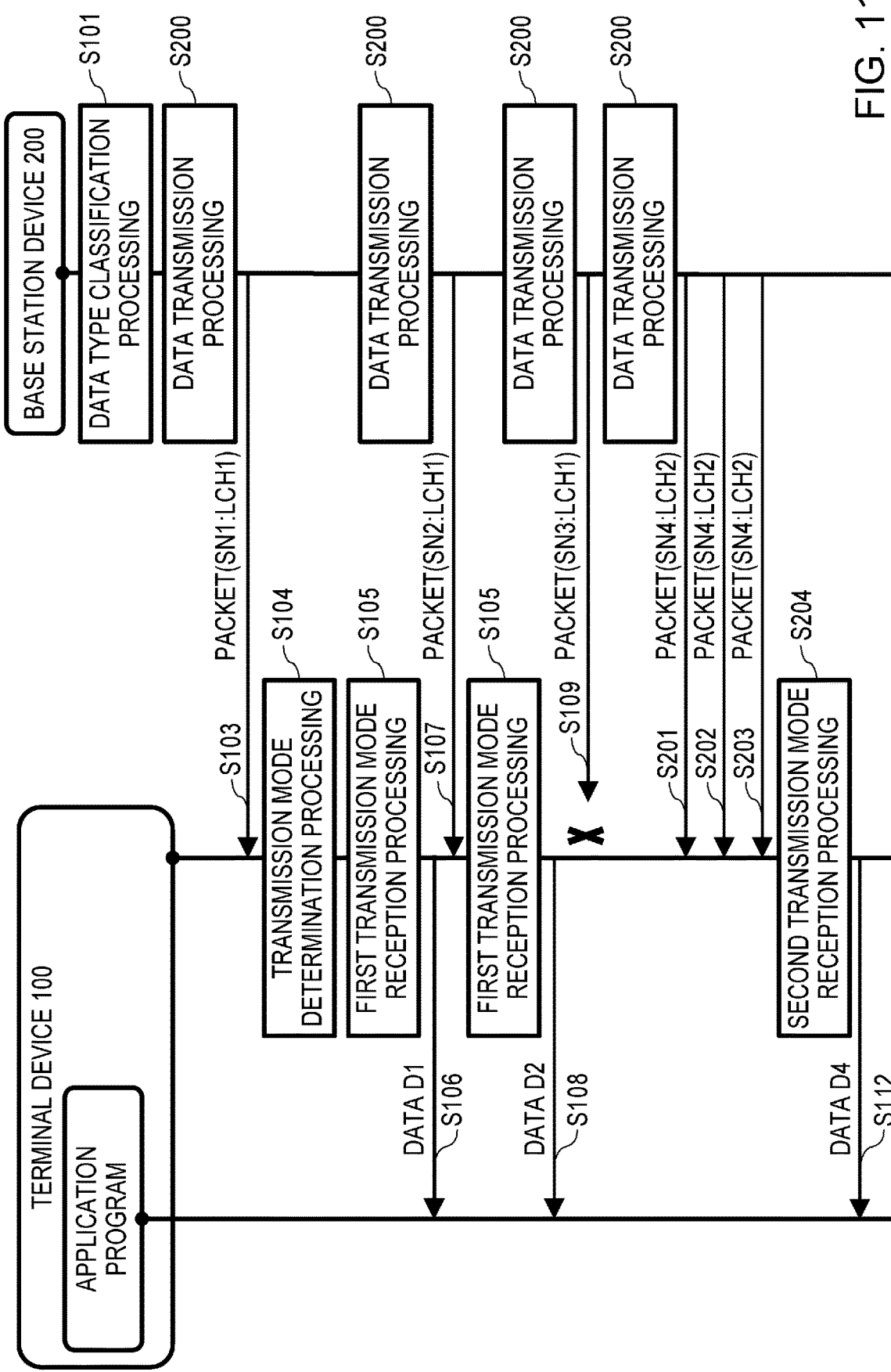
FIG. 11 is a diagram illustrating an example of data transmission/reception processing in the wireless communication system 10.

FIG. 11 is a diagram illustrating an example of data transmission/reception processing in the wireless communication system 10. The sequence of FIG. 11 is an example of a sequence of transmitting data used by an application program included in the terminal device 100 from the base station device 200 to the terminal device 100. A difference between the data transmission processing S102 in the sequence of FIG. 5 and data transmission processing S200 in the sequence of FIG. 11 will be described below.

Figure 12:
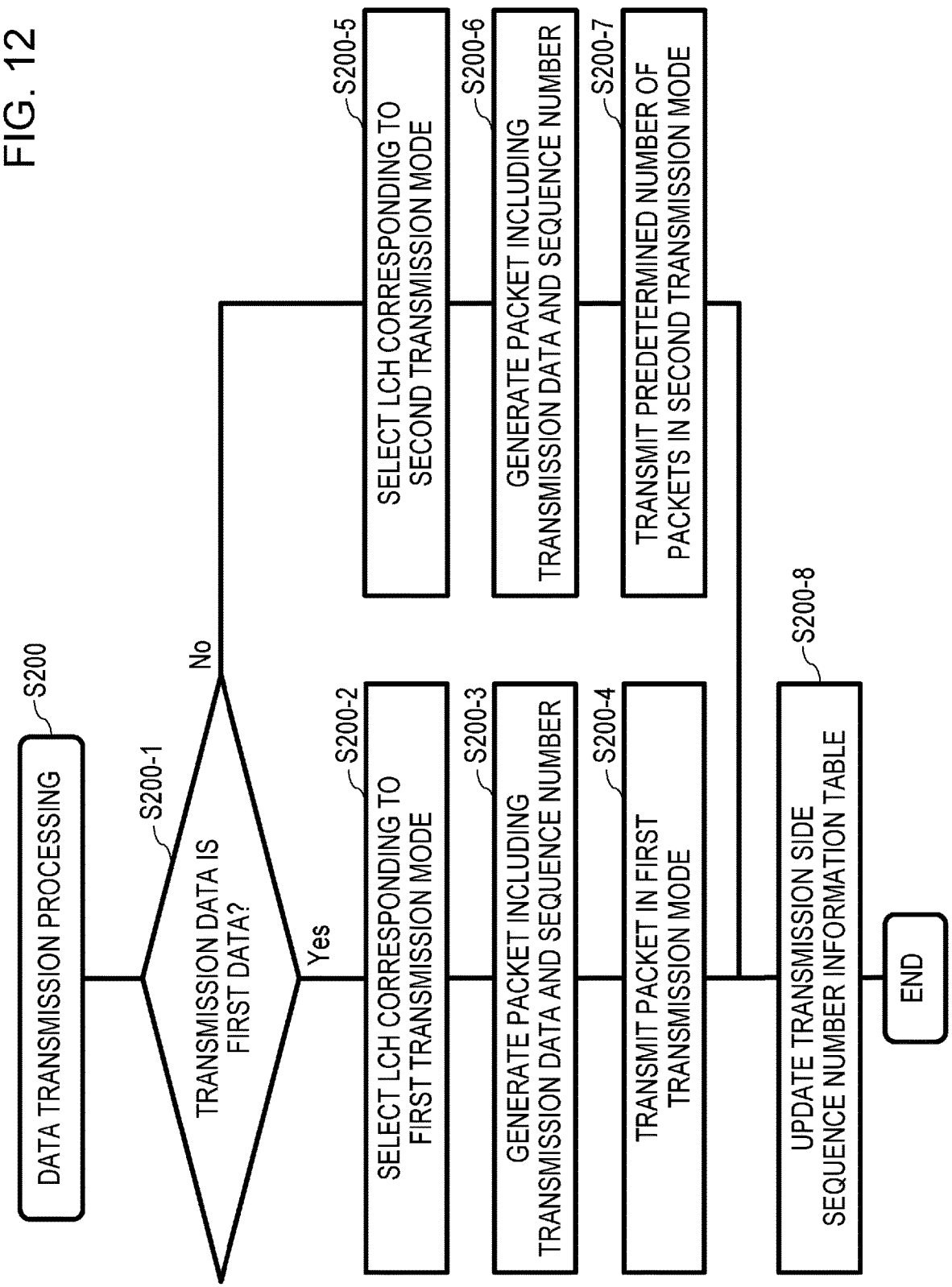
FIG. 12 is a diagram illustrating an example of a processing flowchart of data transmission processing S200.

FIG. 12 is a diagram illustrating an example of a processing flowchart of the data transmission processing S200. When the data to be transmitted is the first data (S200-1: Yes), the base station device 200 selects an LCH corresponding to the first transmission mode (S200-2). In the following description, the processes of S200-3, S200-4, and S200-8 are similar to the processes of S102-3, 102-4, and S102-8 in FIG. 7, respectively.

On the other hand, when the data to be transmitted is the second data (S200-1: No), the base station device 200 selects an LCH corresponding to the second transmission mode (S200-5). The base station device 200 generates a packet including transmission data and a sequence number (S200-6) and transmits a predetermined number of generated packets in the second transmission mode (S200-7).

The predetermined number is two or more, for example. The base station device 200 can improve the probability that a packet including the second data reaches the terminal device 100 by transmitting a plurality of packets including the second data. When the predetermined number is 1, the data transmission processing S200 is similar to the data transmission processing S102 in FIG. 7.

In the following description of the sequence of FIG. 11, since the processes of S101 and S103 to S109 in the sequence of FIG. 11 are similar to the processes of S101 and S103 to S109 in the sequence of FIG. 5, the description thereof will be omitted.

Upon receiving the data D4 of which the data type is the second data, the base station device 200 selects an LCH corresponding to the second transmission mode (S200-5 in FIG. 12) and transmits a predetermined number of (for example, three) packets of SN4 and LCH2 to the terminal device 100 (S201 to S203 and S200-6 and S200-7 in FIG. 12) in the data transmission processing S200. Moreover, the terminal device 100 receives the packets S201, S202, and S203 and performs the second transmission mode reception processing (S204).

Figure 13:
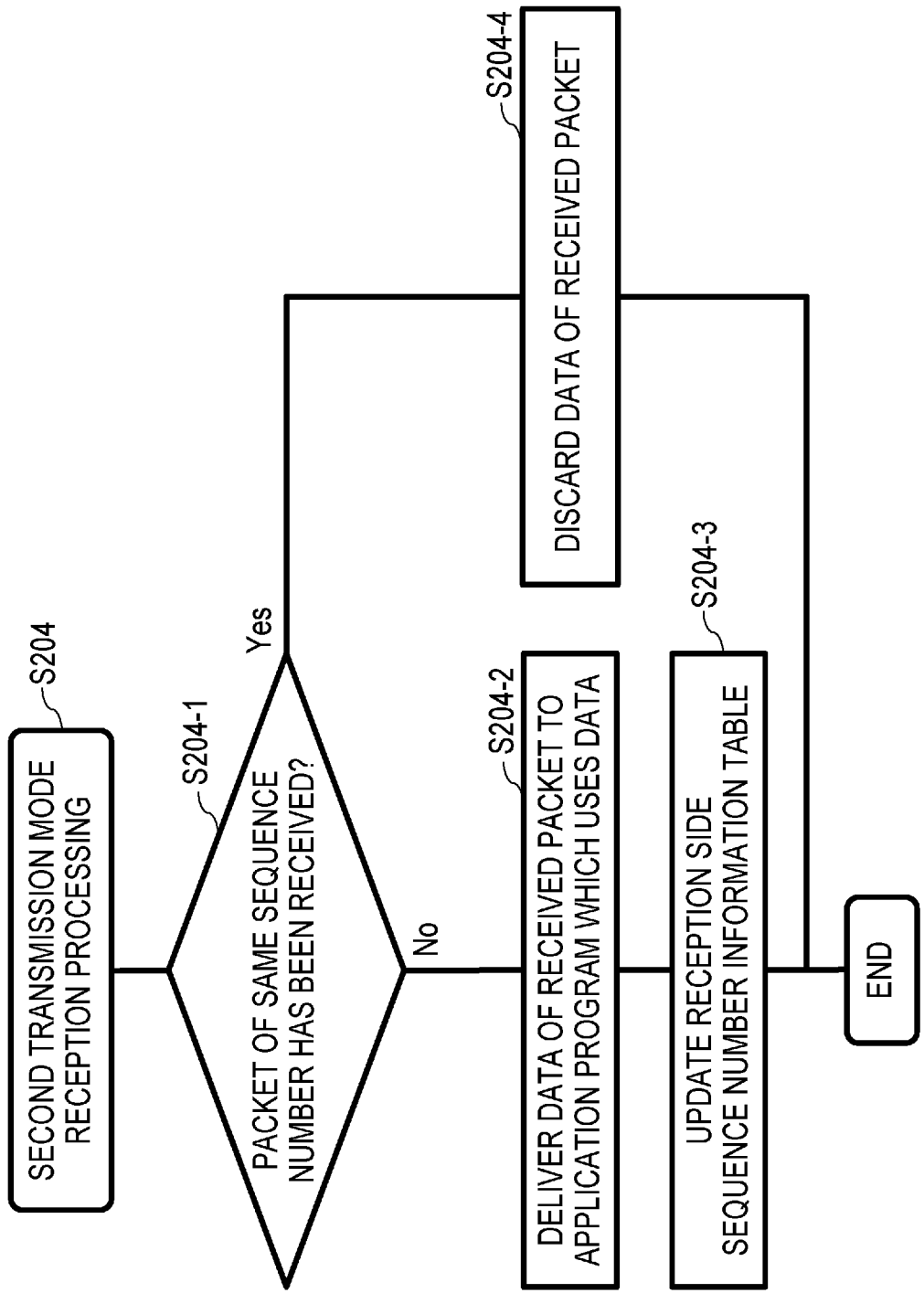
FIG. 13 is a diagram illustrating an example of a processing flowchart of second transmission mode reception processing S204.

FIG. 13 is a diagram illustrating an example of a processing flowchart of the second transmission mode reception processing S204. The terminal device 100 checks whether a packet of the same sequence number as the sequence number of the received packet has been received (S204-1). When the packet of the same sequence number as the sequence number of the received packet has not been received (S204-1: No), the terminal device 100 delivers the data of the received packet to the application program (S204-2). Moreover, the reception-side sequence number information table 122 is updated (S204-3).

On the other hand, when the packet of the same sequence number as the sequence number of the received packet has been received (S204-1: Yes), the terminal device 100 discards the data of the received packet (S204-4) and ends the processing.

Returning to the sequence of FIG. 11, the terminal device 100 delivers the data D4 included in the packet S201 to the application program (S112) in the second transmission mode reception processing S204. Moreover, the terminal device 100 receives the packet S202 and discards the data D4 included in the received packet S202 (S204-4 in FIG. 13) since the packet S201 which is the packet of the same sequence number (SN4) has been received (S204 in FIG. 13: Yes). The terminal device 100 discards the data D4 included in the packet S203 similarly.

In the third embodiment, the base station device 200 improves the probability that the packet including the second data reaches the terminal device to improve the reliability by transmitting a plurality of packets including the second data. Moreover, the terminal device 100 prevents the same second data from being delivered redundantly to the application program by discarding the data of the packet of the same sequence number.

Fourth Embodiment

Next, a fourth embodiment will be described.

Figure 14:
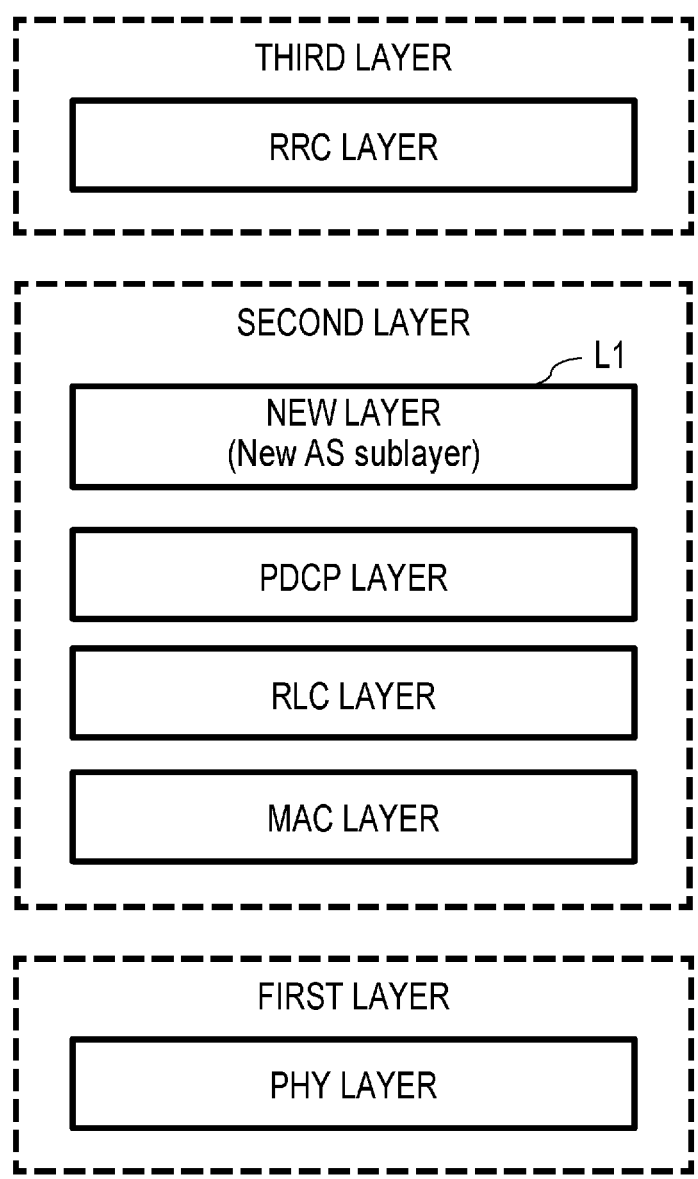
FIG. 14 is a diagram illustrating an example of a protocol stack according to a fourth embodiment.

FIG. 14 is a diagram illustrating an example of a protocol stack according to the fourth embodiment. For example, in 5G, a new layer (hereinafter sometimes referred to as a new layer L1) may be defined in the second layer. In the fourth embodiment, the base station device 200 executes marking on the second data in the new layer L1 (for example, a New AS sublayer or a SDAP (Service Data Adaptation Protocol)) positioned at the top of the second layer.

Figure 15:
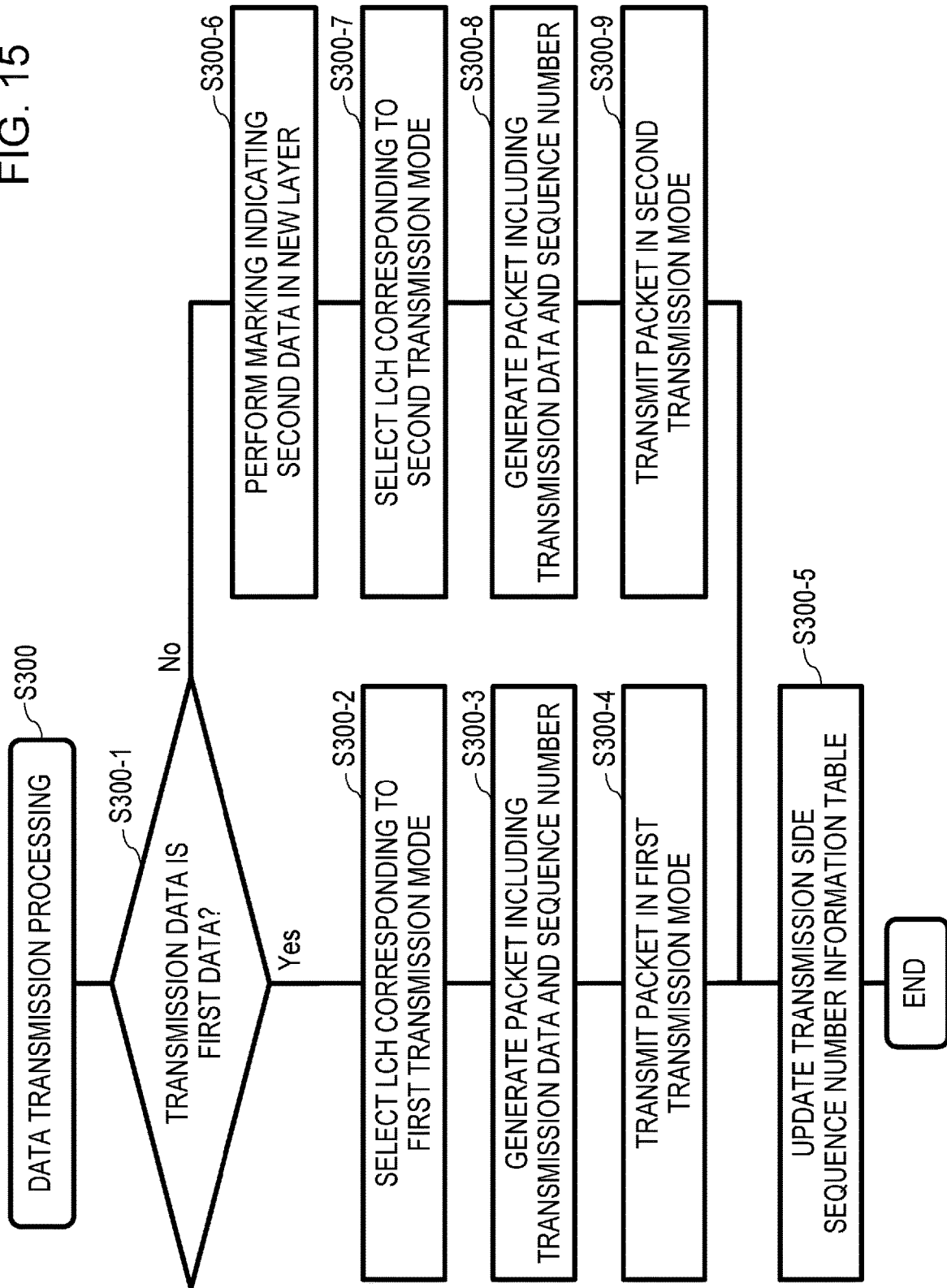
FIG. 15 is a diagram illustrating an example of a processing flowchart of data transmission processing S300.

FIG. 15 is a diagram illustrating an example of a processing flowchart of the data transmission processing S300. When the transmission data is the first data (S300-1: Yes), the base station device 200 performs processing of transmitting the first data (S300-2 to S300-4). The processes S300-2 to S300-5 are processes similar to the processes S102-2 to S102-4 in FIG. 7.

On the other hand, when the transmission data is the second data (S300-1: No), the base station device 200 performs marking in the new layer L1 for indicating that data is the second data (S300-6). For example, the base station device 200 sets a flag (for example, 1 indicates that the data is the second data) for second data to a header portion of the new layer L1 and sets the flag to 1. Moreover, for example, the base station device 200 may set a flag for second data to a header portion of a PDCP layer which is a lower layer and may set the flag to 1. However, when the flag of the header portion of the PDCP layer which is the lower layer is set to 1, the consistency of data of the PDCP layer may be damaged (for example, when data generated using data of a header portion, such as a parity or an authentication random number is present). In this case, the new layer L1 may request reconstruction (re-computation) of data due to change in the header portion in the processing of the PDCP layer or may reconstruct data of the PDCP layer in the processing of the new layer L1.

The base station device 200 performs processing corresponding to the second data (S300-7 to S300-9), updates the transmission-side sequence number information table 222 (S300-5), and ends the processing. The processes of S300-7 to S300-9 are similar to the processes of S102-5 to S102-7 in FIG. 7.

FIG. 16 is a diagram illustrating an example of a processing flowchart of the transmission mode determination processing S400. The terminal device 100 determines whether marking indicating that data is the second data of the received packet has been performed (S400-1). Determination of whether marking indicating that data is the second data is performed is realized by checking the value of the flag for second data set to the header portion of the PDCP layer, for example. Moreover, determination of whether marking indicating that data is the second data has been performed is realized by checking the value of the flag of second data set to the header portion of the new layer L1, for example.

The terminal device 100 performs the second transmission mode reception processing (S400-2) when the marking indicating that data is the second data has been performed (S400-1: Yes) and performs the first transmission mode reception processing (S400-3) when the marking indicating that data is the second data has not been performed (S400-1: No).

In the fourth embodiment, the base station device 200 performs marking indicating that the data to be transmitted is the second data as the processing of a new layer defined in the second layer. In this way, the base station device 200 can realize transmission corresponding to a data type even when a new layer is defined.

In the fourth embodiment, the base station device 200 performs marking indicating that data is the second data and uses a different transmission mode depending on a data type. However, when the marking indicating that data is the second data is performed, the base station device 200 may not use a different transmission mode depending on a data type. Moreover, although the terminal device 100 determines the data type (or the transmission mode) depending on whether marking indicating that data is the second data is performed, the terminal device 100 may determine the transmission mode depending on the LCH number as described in the second embodiment, for example.

Other Embodiment

The processes of the respective embodiments may be combined with each other.

For example, the base station device (the wireless communication device) may perform part or all of the processes of the first to fourth embodiments. Similarly, for example, the terminal device (the wireless communication device) may perform part or all of the processes of the first to fourth embodiments.

According to the disclosure, desirable transmission/reception processing related to pieces of data having different allowable latencies is provided.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that the various changes, substitutions, and alterations could be made hereto without departing from the spirit and scope of the disclosure.

REFERENCE SIGNS LIST

10: Wireless communication system
100 . . . Terminal device (Wireless communication device)
101 . . . Control unit
102 . . . Transmission unit
103 . . . Receiving unit
104 . . . Processing unit
105 . . . AP
110 . . . CPU
120 . . . Storage
121 . . . Communication program
1211 . . . Transmission mode determination module
1212 . . . First transmission mode reception module
1213 . . . Second transmission mode reception module
122 . . . Reception-side sequence number information table
130 . . . Memory
150 . . . RF circuit
200 . . . Base station device
210 . . . CPU
220 . . . Storage
221 . . . Communication control program
2211 . . . Data type classification module
2212 . . . Data transmission module
222 . . . Transmission-side sequence number information table
230 . . . Memory
240 . . . NIC
250 . . . RF circuit
300 . . . Network

What is claimed is:

1. A wireless communication device that transmits data to a second wireless communication device using a packet including a transmission number, the wireless communication device comprising:
a controller configured to control a data transferring of a data link layer, the data transferring including a classification process that classifies, according to a process of higher layer of an RLC (Radio Link Control) layer that is included a second layer which manages data link for wireless connection, the data as first data or second data, the data being classified as the first data when a transmission condition indicating a condition related to transmission of the data is a first transmission condition, the data being classified as the second data when the transmission condition of the data is a second transmission condition different from the first transmission condition; and a transmitter configured to:

when the data is the first data, select a first logical channel of a first logical channel number from a plurality of the logical channels and transmit the data, and when the data is the second data, select a second logical channel of a second logical channel number from the plurality of the logical channels and transmit the data, wherein the first logical channel number corresponds to a first transmission mode in the RLC layer and indicates to the second wireless communication device that the data is transmitted using the first transmission mode, and the second logical channel number corresponds to a second transmission mode in the RLC layer and indicates to the second wireless communication device that the data is transmitted using the second transmission mode.

2. The wireless communication device according to claim 1, wherein the first transmission mode is a transmission mode in which the second wireless communication device is caused to execute processing corresponding to data included in a packet received in advance by the second wireless communication device when a packet of a transmission number successive to the received packet is received and the second wireless communication device is not caused to execute the processing corresponding to the data included in the packet received in advance by the second wireless communication device until the packet of the transmission number successive to the packet received in advance is received when a packet of a transmission number that is not successive to the packet received in advance by the second wireless communication device is received, and the second transmission mode is a transmission mode in which the second wireless communication device is caused to execute the processing corresponding to the data included in the packet received in advance by the second wireless communication device when a packet of a transmission number that is successive to or not successive to the packet received in advance by the second wireless communication device.

3. The wireless communication device according to claim 2, wherein the processing corresponding to the data is processing of delivering the data to an application program which uses the data and is included in the second wireless communication device.

4. The wireless communication device according to claim 1, wherein the first transmission condition is an allowable latency indicating a latency allowed for transmitting the data, and the second transmission condition is an allowable latency shorter than the first transmission condition.

5. The wireless communication device according to claim 1, wherein the second data is data with higher degree of urgency than the first data.

6. The wireless communication device according to claim 1, wherein the first transmission mode is a transmission mode in which the second wireless communication device is requested to transmit an acknowledgement indicating that a packet has been received, and the second transmission mode is a transmission mode in which the second wireless communication device is not requested to transmit the acknowledgement.

7. The wireless communication device according to claim 6, wherein the first transmission mode is an AM (Acknowledged Mode), and the second transmission mode is a UM (Unacknowledged Mode).

8. The wireless communication device according to claim 1, wherein the transmitter incorporates information indicating that data is the second data in a packet that transmits the data in an uppermost layer among a plurality of layers included in the second layer.

9. A wireless communication device that receives data that is transmitted using a packet including a transmission number from a first wireless communication device, the wireless communication device comprising:

a receiver configured to receive the packet including the data at a data link layer; and a processor configured to:

control to perform a first reception process corresponding to a first transmission mode in an RLC (Radio Link Control) layer included in the data link layer when the data is received via a first logical channel corresponding to a first logical channel number, and control to perform a second reception process corresponding to a second transmission mode in the RLC layer included in the data link layer when the data is received via a second logical channel corresponding to a second logical channel number, wherein the first logical channel number corresponds to the first transmission mode, and the second logical channel number corresponds to the second transmission mode.

10. The wireless communication device according to claim 9, wherein the first reception process is a process in which executes processing corresponding to data included in a packet received in advance when a packet of a transmission number successive to the received packet is received and not execute the processing corresponding to the data included in the packet received in advance until the packet of the transmission number successive to the packet received in advance is received when a packet of a transmission number that is not successive to the packet received in advance, and the second reception process is a process in which the executes the processing corresponding to the data included in the packet received in advance when a packet of a transmission number that is successive to or not successive to the packet received in advance.

11. A wireless communication system comprising:

a first wireless communication device configured to transmit data using a packet including a transmission number; and a second wireless communication device configured to receive the data, wherein the first wireless communication device includes:

a controller configured to control a data transferring of a data link layer, the data transferring including a classification process that classifies, according to a process of higher layer of an RLC (Radio Link Control) layer that is included a second layer which manages data link for wireless connection, the data as first data or second data, the data being classified as the first data when a transmission condition indicating a condition related to transmission of the data is a first transmission condition, the data being classified as the second data when the transmission condition of the data is a second transmission condition different from the first transmission condition; and a transmitter configured to:

when the data is the first data, select a first logical channel of a first logical channel number from a plurality of the logical channels and transmit the data, and when the data is the second data, select a second logical channel of a second logical channel number from the plurality of the logical channels and transmit the data, and the second communication device includes:

a receiver configured to receive the packet including the data, and a processor configured to:

control to perform a first reception process when the data is received via the first logical channel corresponding to the first logical channel number, and control to perform a second reception process when the data is received via the second logical channel corresponding to the second logical channel number, wherein the first logical channel number corresponds to the first transmission mode, and the second logical channel number corresponds to the second transmission mode.

* * * * *